(12) United States Patent
Shelton et al.

(10) Patent No.: US 7,752,648 B2
(45) Date of Patent: Jul. 6, 2010

(54) APPARATUS AND METHODS FOR HANDLING INTERACTIVE APPLICATIONS IN BROADCAST NETWORKS

(75) Inventors: Ian R Shelton, Ringwood (GB); Michael B Costello, Staines (GB); Ronnie Dan, London (GB); Nicholas Thexton, London (GB); Nicholas Ashton Hall, Walton-on-Thames (GB); James Geoffrey Walker, Guildford (GB); Stuart P Ashby, Warfield (GB); Neil Cormican, London (GB); Rahul Chakkara, London (GB)

(73) Assignee: NDS Limited, Middlesex (GB)

( * ) Notice: Subject to any disclaimer, the term of this patent is extended or adjusted under 35 U.S.C. 154(b) by 602 days.

(21) Appl. No.: 10/543,765

(22) PCT Filed: Feb. 4, 2004

(86) PCT No.: PCT/IL2004/000111

§ 371 (c)(1),
(2), (4) Date: Jul. 28, 2005

(87) PCT Pub. No.: WO2004/072935

PCT Pub. Date: Aug. 26, 2004

(65) Prior Publication Data

US 2006/0125962 A1    Jun. 15, 2006

Related U.S. Application Data

(60) Provisional application No. 60/452,743, filed on Mar. 7, 2003.

(30) Foreign Application Priority Data

Feb. 11, 2003  (GB) .................................. 0303093.9
Jan. 30, 2004  (GB) .................................. 0402116.8

(51) Int. Cl.
*H04N 7/16* (2006.01)

(52) U.S. Cl. ..................... 725/136; 725/135; 725/139

(58) Field of Classification Search ................... 463/40
See application file for complete search history.

(56) References Cited

U.S. PATENT DOCUMENTS 4,355,805 A * 10/1982 Baer et al. .................... 463/31

(Continued)

FOREIGN PATENT DOCUMENTS

EP       0 873 772 A1    10/1998

(Continued)

OTHER PUBLICATIONS

ISO/IEC-13818-6, MPEG, DSM-CC specifications, Oct. 2000.

(Continued)

*Primary Examiner*—Dominic D Saltarelli
(74) *Attorney, Agent, or Firm*—Ladas and Parry LLP

(57) ABSTRACT

An interactive method includes receiving, at a display device, background video including a multiplicity of video frames, at least one of the multiplicity of video frames including a plurality of sub-pictures, each of the plurality of sub-pictures representing an alternative background, and switching, at the display device, between a first sub-picture of the plurality of sub-pictures and a second sub-picture of the plurality of sub-pictures. Related apparatus and methods are also disclosed.

35 Claims, 10 Drawing Sheets

U.S. PATENT DOCUMENTS

| | | | |
|---|---|---|---|
| 4,766,541 A * | 8/1988 | Bleich et al. .................. 463/31 |
| 4,827,344 A | 5/1989 | Astle et al. |
| 5,080,377 A * | 1/1992 | Stamper et al. ............... 463/31 |
| 5,130,794 A * | 7/1992 | Ritchey ........................ 348/39 |
| 5,173,777 A | 12/1992 | Dangschat |
| 5,236,199 A | 8/1993 | Thompson, Jr. |
| 5,264,838 A * | 11/1993 | Johnson et al. ............. 345/611 |
| 5,523,791 A | 6/1996 | Berman |
| 5,600,368 A | 2/1997 | Matthews, III |
| 5,673,401 A | 9/1997 | Volk et al. |
| 5,754,770 A | 5/1998 | Shiels et al. |
| 5,768,539 A | 6/1998 | Metz et al. |
| 5,774,172 A | 6/1998 | Kapell et al. |
| 5,808,617 A | 9/1998 | Kenworthy et al. |
| 5,818,440 A | 10/1998 | Allibhoy et al. |
| 5,850,230 A | 12/1998 | San et al. |
| 5,850,352 A | 12/1998 | Moezzi et al. |
| 5,892,554 A | 4/1999 | DiCicco et al. |
| 5,894,320 A | 4/1999 | Vancelette |
| 5,931,908 A | 8/1999 | Gerba et al. |
| 5,943,445 A | 8/1999 | Dufaux |
| 6,016,150 A | 1/2000 | Lengyel et al. |
| 6,201,536 B1 | 3/2001 | Hendricks et al. |
| 6,205,260 B1 | 3/2001 | Crinon et al. |
| 6,259,828 B1 | 7/2001 | Crinon et al. |
| 6,275,239 B1 | 8/2001 | Ezer et al. |
| 6,314,569 B1 | 11/2001 | Chernock et al. |
| 6,478,680 B1 | 11/2002 | Yoshioka et al. |
| 6,556,775 B1 | 4/2003 | Shimada et al. |
| 7,106,749 B1 | 9/2006 | Darshan et al. |
| 2001/0040577 A1 | 11/2001 | San et al. |
| 2001/0043224 A1 | 11/2001 | San et al. |
| 2001/0047518 A1 | 11/2001 | Sahota et al. |
| 2002/0010019 A1* | 1/2002 | Hiraoka et al. ................ 463/31 |
| 2002/0034980 A1* | 3/2002 | Lemmons et al. ............. 463/40 |
| 2002/0035728 A1 | 3/2002 | Fries |
| 2002/0050999 A1 | 5/2002 | San et al. |
| 2002/0062481 A1* | 5/2002 | Slaney et al. .................. 725/42 |
| 2002/0069415 A1 | 6/2002 | Humbard et al. |
| 2002/0085122 A1 | 7/2002 | Konuma |
| 2002/0086734 A1* | 7/2002 | Krishnan et al. .............. 463/43 |
| 2002/0112249 A1 | 8/2002 | Hendricks et al. |
| 2002/0138831 A1 | 9/2002 | Wachtfogel et al. |
| 2002/0188943 A1 | 12/2002 | Freeman et al. |
| 2002/0199190 A1 | 12/2002 | Su |
| 2003/0011636 A1 | 1/2003 | Feroglia et al. |
| 2003/0093786 A1 | 5/2003 | Amsellem |
| 2003/0163832 A1 | 8/2003 | Tsuria et al. |
| 2003/0184679 A1 | 10/2003 | Meehan |
| 2004/0100556 A1 | 5/2004 | Stromme |
| 2004/0199658 A1 | 10/2004 | Darshan et al. |
| 2005/0018082 A1 | 1/2005 | Larsen et al. |
| 2006/0125962 A1 | 6/2006 | Shelton et al. |

FOREIGN PATENT DOCUMENTS

| | | |
|---|---|---|
| EP | 1 050 328 A1 | 11/2000 |
| EP | 1720352 | 11/2006 |
| JP | 2002-016895 | 1/2002 |
| JP | 2003-186484 | 7/2003 |
| WO | 90/13204 | 11/1990 |
| WO | 98/31153 | 7/1998 |
| WO | 98/46014 | 10/1998 |
| WO | 98/57718 | 12/1998 |
| WO | 00/01148 | 1/2000 |
| WO | 00/01149 | 1/2000 |
| WO | 00/45599 | 8/2000 |
| WO | 01/35669 | 5/2001 |
| WO | 01/35669 A1 | 5/2001 |
| WO | 01/52541 | 7/2001 |
| WO | 01/52541 A1 | 7/2001 |
| WO | 02/01866 | 1/2002 |
| WO | 02/01866 A1 | 1/2002 |
| WO | 02/24289 | 3/2002 |
| WO | 02/067050 | 8/2002 |
| WO | 03/010970 | 2/2003 |
| WO | 03/010970 A2 | 2/2003 |
| WO | 2004/072935 | 8/2004 |
| WO | 2005/071973 | 8/2005 |
| WO | 2005/076618 | 8/2005 |
| WO | 2007/009876 | 1/2007 |

OTHER PUBLICATIONS

The product description of "Value@TV", described at the World Wide Web site www.nds.com/interactive_tv/interactive_tv.html.

The product description of "Combustion", described at the World Wide Web site www.discreet.com/3dsmax.

The product description of "Maya", described at the World Wide Web site www.alias.com.

The product description of "SoftimageXSI" described at the World Wide Web site www.softimage.com.

The product description of "Pinnacle Commotion", described at the World Wide Web site www.pinnaclesys.com.

The product description of "After Effects", described at the World Wide Web site www.adobe.com.

* cited by examiner

APPARATUS AND METHODS FOR HANDLING INTERACTIVE APPLICATIONS IN BROADCAST NETWORKS

CROSS-REFERENCE TO RELATED APPLICATIONS

The present application claims priority from U.S. Provisional Patent Application Ser. No. 60/452,743, filed 7 Mar. 2003, and from UK Patent Application No. 0303093.9, filed 11 Feb. 2003, the disclosures of which are hereby incorporated herein by reference. The present application also claims priority from a UK Patent Application of NDS Limited, filed 30 Jan. 2004 and entitled "Apparatus and Methods for Transmitting and Handling Game Capabilities in a Broadcast Network", and from a corresponding U.S. Provisional Patent Application of Ian R. Shelton et al, filed 2 Feb. 2004 and entitled "Apparatus and Methods for Transmitting and Handling Game Capabilities in a Broadcast Network", the disclosures of which are hereby incorporated herein by reference.

FIELD OF THE INVENTION

The present invention relates to interactive applications in broadcast networks.

BACKGROUND OF THE INVENTION

Today, many set-top boxes (STBs) operating in broadcast networks have limited processing capabilities that limit utilization of interactive applications such as games. Since the ability to display and manipulate rich multimedia content is considered essential for many interactive applications, particularly interactive games, the limited processing capabilities of the STBs enable utilization of only simple types of interactive applications and particularly simple types of games having uncomplicated or slow-changing backgrounds.

Some aspects of technologies and related art that may be useful in understanding the present invention are described in the following publications:

Published PCT patent application WO 98/57718, which describes apparatus for interactively generating a display signal;

Published European Patent application EP 0873772, which describes an interactive, predictive game control system for use in conjunction with a live TV broadcast received by one or more remote players;

Published European Patent application EP 1050328, which describes an interactive broadcast system comprising a plurality of user interfaces each comprising a local clock signal generator;

Published PCT patent application WO 00/45599, which describes an interactive system that provides a video program signal and generates interactive content data to be associated with at least one object within a frame of the video program;

Published PCT Application WO 00/01149, assigned to NDS Limited, which describes a digital television recording method comprising: broadcasting a television program associated with a broadcaster set of parameters enabling access to a first set of predetermined portions of the program; operating an agent for determining whether to record the program and for associating with the program, upon recording of the program, an agent set of parameters enabling access to a second set of predetermined portions of the program; storing the program together with the broadcaster set of parameters and the agent set of parameters to generate an addressable program; retrieving at least a portion of the addressable program; displaying the at least a portion of the addressable program to a user; receiving from the user a user set of parameters enabling access to a third set of predetermined portions of the addressable program; editing the addressable program to include the user set of parameters enabling access to the third set of predetermined portions of the addressable program thereby generating an edited addressable program; and storing the edited addressable program;

Published PCT Application WO 01/52541, assigned to NDS Limited, which describes a method for displaying advertisements transmitted to a user unit;

Published PCT Application WO 02/01866 and published US Patent Application US 2003/0163832, both assigned to NDS Limited, which describe methods and apparatus for managing, implementing and using interactive applications and content that are digitally recorded and viewed in real-time and/or a time-shifted mode;

A publication of NDS Limited at the World Wide Web site www.nds.com/interactive_tv/interactive_tv.html of interactive television infrastructure Value@TV™;

A document ISO/IEC-13818-6, MPEG DSM-CC specifications, July 1999;

Publications of the following software tools: Discreet™'s 3ds max™ and Combustion™ that are described at the World Wide. Web site www.discreet.com/3dsmax; Alias™'s Maya™ which is described at the World Wide Web site www.alias.com; Softimage|XSI which is described at the World Wide Web site www.softimage.com; Pinnacle Commotion which is described at the World Wide Web site www-.pinnaclesys.com; Adobe's After Effects software which is described at the World Wide Web site www.adobe.com; and Avid Technology, Inc.'s Media Composer and Avid Xpress that are described at the World Wide Web site www.avid.com;

Published PCT Application WO 03/010970, assigned to NDS Limited, which describes a method for accessing a desired point in time-synchronized data within a stream, the stream being associated with time information, the method including providing a desired presentation time associated with a desired point within a time-synchronized data stream, determining a stream access point, decoding the stream beginning at the stream access point, and assigning a time associated with the stream access point as a utilization time;

Published PCT Application WO 01/35669 and U.S. patent application Ser. No. 09/574,096, both assigned to NDS Limited, which describe a method for processing a data stream including receiving a transport stream (TS), storing at least a portion of the TS, the at least a portion of the TS having a beginning and including a plurality of TS packets, determining, from among the plurality of TS packets, at least one TS packet including a candidate access point, storing in an index store a byte offset of the candidate access point; and storing in the index store a plurality of indications of byte offset, each byte offset being associated with an arrival time of a received TS packet;

Published US Patent application 2002/0199190 of Su, which describes a method and apparatus for presenting a variety of content from a multitude of sources broadcast from a head end server to a client device;

Published US Patent application 2002/0188943 of Freeman et al, which describes an interactive digital system enabling viewers full and active participation in experiencing a live broadcast event;

Published US Patent application 2002/0112249 of Hendricks et al, which describes a method and an apparatus that are used to target interactive virtual objects to subscribers in a television delivery system;

Published US Patent application 2002/0086734 of Krishnan et al, which describes an Electronic Game Console that is connected to a television set-top box;

Published US Patent application 2002/0085122 of Konuma, which describes an image display method and device;

Published US Patent application 2002/0069415 of Humbard et al, which describes a user interface and navigator that improves the viewer's viewing experience and provides improved access to programs, including interactive features;

Published US Patent application 2002/0050999 of San et al, which describes a fully programmable graphics microprocessor which is designed to be embodied in a removable external memory unit for connection with a host information processing system;

Published US Patent application 2002/0035728 of Fries, which describes an interactive entertainment and information system using a television set-top box, wherein pages of information are periodically provided to the set-top box for user interaction therewith;

Published US Patent application 2001/0047518 of Sahota et al, which describes a method and system to provide interactivity using an interactive channel bug;

Published US Patent applications 2001/0043224 and 2001/0040577 of San et al, which describe an external memory system having programmable graphics processor for use in a video game system or the like;

Published US Patent application 2003/0011636 of Feroglia et al, which describes a method for magnifying content;

Published US Patent application 2003/0093786 of Amsellem, which describes a method for producing an interactive television broadcast;

U.S. Pat. No. 6,314,569 to Chemock et al, which describes a system for video, audio, and graphic presentation in tandem with video/audio play;

U.S. Pat. No. 6,275,239 to Ezer et al, which describes a media coprocessor for performing 3-D graphics, video, and audio functions;

U.S. Pat. Nos. 6,259,828 and 6,205,260 to Crinon et al, which describe a sprite-based coding system that includes an encoder and decoder where sprite-building is automatic and segmentation of the sprite object is automatic and integrated into the sprite building as well as the coding process;

U.S. Pat. No. 6,201,536 of Hendricks et al, which describes a network manager for use with a cable television system headend capable of monitoring and managing headend components and set top terminals in a television delivery system;

U.S. Pat. No. 6,016,150 to Lengyel et al, which describes a layered graphics rendering pipeline for real time 3D animation that independently renders terms in a shading model to separate image layers;

U.S. Pat. No. 5,943,445 to Dufaux, which describes dynamic sprites for encoding video data;

U.S. Pat. No. 5,931,908 to Gerba et al, which describes a method and apparatus for liking real-time data with audiovisual content to enable a user to make selections, manipulate data, and to execute functions interactively through an audiovisual display unit based upon audiovisual content being displayed at the time;

U.S. Pat. No. 5,894,320 to Vancelette, which describes a multi-channel television system with viewer-selectable video and audio;

U.S. Pat. No. 5,850,352 to Moezzi et al, which describes immersive video, including video hypermosaicing to generate from multiple video views of a scene a three-dimensional video mosaic from which diverse virtual video scene images are synthesized, including panoramic, scene interactive and stereoscopic images;

U.S. Pat. No. 5,850,230 to San et al, which describes an external memory system having programmable graphics processor for use in a video game system or the like;

U.S. Pat. No. 5,818,440 to Allibhoy et al, which describes automatic execution of an application in interactive television;

U.S. Pat. No. 5,808,617 to Kenworthy et al, which describes a method and system for depth complexity reduction in a graphics rendering system;

U.S. Pat. No. 5,774,172 to Kapell et al, which describes a video entertainment system that includes a video display device and a user interface unit connected for operation in conjunction with the video display device to receive a television image and to display the television image on the video display device;

U.S. Pat. No. 5,768,539 to Metz et al, which describes downloading of applications software through a broadcast channel;

U.S. Pat. No. 5,754,770 to Shiels et al, which describes information handling for an interactive apparatus;

U.S. Pat. No. 5,673,401 of Volk et al, which describes an object-oriented system for generating and displaying control items that allow users of an interactive network to recognize and select control functions via a graphical user interface;

U.S. Pat. No. 5,600,368 to Matthews, which describes an interactive television system and method for viewer control of multiple camera viewpoints in broadcast programming;

U.S. Pat. No. 5,523,791 to Berman, which describes apparatus for use with standard television (TV) for superimposing images, captions, titles, or other information over the television scene; and U.S. Pat. No. 5,236,199 to Thompson, which describes an interactive media system and telecomputing method using telephone keypad signaling.

An aspect of timing information protection which may be useful in understanding the present invention is described in a UK patent application of NDS Limited, filed 26 Jan. 2004 and entitled "Timeline Protection", and in a corresponding US Provisional Patent Application of David White, filed 27 Jan. 2004 and entitled "Timeline Protection".

The disclosures of all references mentioned above and throughout the specification, as well as the disclosures of all references mentioned in those references, are hereby incorporated herein by reference.

SUMMARY OF THE INVENTION

The present invention seeks to provide improved capabilities for handling interactive applications in broadcast networks.

There is thus provided in accordance with a preferred embodiment of the present invention an interactive method including receiving, at a display device, background video including a multiplicity of video frames, at least one of the multiplicity of video frames including a plurality of sub-pictures, each of the plurality of sub-pictures representing an alternative background, and switching, at the display device, between a first sub-picture of the plurality of sub-pictures and a second sub-picture of the plurality of sub-pictures.

Additionally, the method also includes upsampling the second sub-picture to a full video frame after the switching. The upsampling preferably includes upsampling for displaying on a display.

The switching preferably includes seamlessly switching between the first sub-picture and the second sub-picture.

Preferably, at least one of the first sub-picture and the second sub-picture includes a 3-dimensional (3D) scene.

Additionally, the method also includes displaying a display effect in response to the switching. The display effect preferably includes at least one of the following: an illusion of an image which is broader than an image displayed before the switching, an illusion of an image which is higher than the image displayed before the switching, an illusion of an image which is broader and higher than the image displayed before the switching, and an illusion of an image which is, with respect to the image displayed before the switching, at least one of the following: horizontally distorted, and vertically distorted.

Preferably, the switching includes switching between outputs of two audio decoders.

The switching also preferably includes switching between the first sub-picture and the second sub-picture in response to at least one of the following: timing information, user input, an instruction from a headend, an instruction from a broadcast source, and an instruction from an interactive application.

Preferably, the receiving includes receiving the background video from a broadcast transmission. Alternatively, the receiving includes receiving the background video from a storage device of a personal video recorder (PVR).

Additionally, the method also includes, prior to the switching, receiving object information at the display device, the object information including information determining an object, and overlaying, at the display device, the object over the background video. In such a case, the switching may preferably include switching between the first sub-picture and the second sub-picture in response to the object approaching or entering a border of the first sub-picture. The object preferably includes a game object.

Preferably, the background video and the object information are related to an interactive game application.

Further preferably, in a case where the step of receiving background video includes receiving the background video from a broadcast transmission, the step of receiving object information includes receiving the object information from one of the following: a broadcast transmission, and a storage device of a PVR. In a case where the step of receiving background video includes receiving the background video from a storage device of a PVR, the step of receiving object information includes receiving the object information from one of the following: a broadcast transmission, and the storage device of the PVR.

Additionally, the method also includes receiving assistance information at the display device, the assistance information including area assistance information related to the background video, preparing, at the display device, graphics for display at a display location, the preparing being based, at least in part, on at least a portion of the assistance information associated with the display location, and spatially synchronizing the prepared graphics with the background video.

Preferably, the at least a portion of the assistance information includes non-boundary assistance information. The non-boundary assistance information preferably includes at least one of the following: physics information, lighting information, at least one alpha mask, information on at least one target zone, information on at least one dead zone, information regarding at least one game specific area, control information, and preferred track information.

Preferably, the preparing includes temporally synchronizing the prepared graphics with the background video.

Additionally, the method also includes displaying the prepared graphics and the background video in a synchronized form.

Preferably, the preparing also includes the step of generating, at the display device, audio for rendering in association with the graphics. The generating preferably includes preparing the audio for rendering in association with the graphics based, at least in part, on the at least a portion of the assistance information associated with the display location. Additionally, the generating also includes synchronizing the prepared audio with the graphics and the background video.

Preferably, in a case where the step of receiving background video includes receiving the background video from a broadcast transmission, the step of receiving assistance information includes receiving the assistance information from one of the following: a broadcast transmission, and a storage device of a PVR. In a case where the step of receiving background video includes receiving the background video from a storage device of a PVR, the step of receiving assistance information includes receiving the assistance information from one of the following: a broadcast transmission, and the storage device of the PVR.

Preferably, the background video, the assistance information, and the graphics are related to an interactive game application.

Further preferably, the first sub-picture corresponds to a first perspective view of a scene and the second sub-picture corresponds to a second perspective view of the scene. The first perspective view is preferably different from the second perspective view.

Additionally, the method also includes receiving, at the display device, distinguishing information distinguishing portions of the background video by at least one characteristic, and determining, at the display device, whether an action is to be performed on the object based on the distinguishing information.

The determining preferably includes determining whether the action is to be performed on the object when the object moves from a first one of the portions of the background video towards a second one of the portions of the background video distinguished from the first one of the portions of the background video by the at least one characteristic.

Additionally, the method also includes using the distinguishing information to trigger an audio signal when the object moves from the first one of the portions of the background video towards the second one of the portions of the background video.

Preferably, the at least one characteristic includes at least one of the following: a lighting characteristic, a physics characteristic, an alpha mask characteristic, a target characteristic, a dead zone characteristic, a characteristic of a game specific area, a preferred track characteristic, and a track-control characteristic.

The distinguishing information preferably includes at least one of the following: at least one in-video mask, and interactive application data. The at least one in-video mask preferably distinguishes between at least one of the following: boundary regions in the background video, and collision regions in the background video.

Preferably, the at least one in-video mask includes at least one of the following: at least one alpha mask, at least one target, at least one dead zone, tracking information, and control information.

The background video, the object information and the distinguishing information are preferably related to an interactive game application, and the action preferably includes an action in the interactive game application.

In a case where the step of receiving background video includes receiving the background video from a broadcast transmission and the step of receiving object information includes receiving the object information from a broadcast transmission, the step of receiving distinguishing information includes receiving the distinguishing information from one of the following: a broadcast transmission, and a storage device of a PVR.

In a case where the step of receiving background video includes receiving the background video from a storage device of a PVR and the step of receiving object information includes receiving the object information from the storage device of the PVR, the step of receiving distinguishing information includes receiving the distinguishing information from one of the following: a broadcast transmission, and the storage device of the PVR.

In a case where the step of receiving background video includes receiving the background video from a broadcast transmission and the step of receiving object information includes receiving the object information from a storage device of a PVR, the step of receiving distinguishing information includes receiving the distinguishing information from a broadcast transmission.

In a case where the step of receiving background video includes receiving the background video from a storage device of a PVR and the step of receiving object information includes receiving the object information from a broadcast transmission, the step of receiving distinguishing information includes receiving the distinguishing information from the storage device of the PVR.

The method may also preferably include receiving object information at the display device, the object information including information determining an object, computing, at the display device, an adjustable sliding window display frame around the object, upsampling a portion of the background video included in the adjustable sliding window display frame, and overlaying, at the display device, the object over the upsampled portion of the background video.

There is also provided in accordance with a preferred embodiment of the present invention an interactive method including receiving background video at a display device, receiving object information at the display device, the object information including information determining an object, computing, at the display device, an adjustable sliding window display frame around the object, upsampling a portion of the background video included in the adjustable sliding window display frame, and overlaying, at the display device, the object over the upsampled portion of the background video. The object preferably includes a game object.

Preferably, the background video, the object information, and the adjustable sliding window display frame around the object are related to an interactive game application.

The computing preferably includes using the adjustable sliding window display frame around the object for tracking the object. Alternatively or additionally, the computing includes using the adjustable sliding window display frame around the object for providing an effect of a change of speed of the background video.

Further alternatively or additionally, the computing includes using the adjustable sliding window display frame around the object for altering a portion of the background video which is displayed together with the object.

Still further alternatively or additionally, the computing includes using the adjustable sliding window display frame around the object for providing a shudder effect.

Preferably, the step of receiving background video includes receiving the background video from a broadcast transmission, and the step of receiving object information includes receiving the object information from one of the following: a broadcast transmission, and a storage device of a PVR Alternatively, the step of receiving background video includes receiving the background video from a storage device of a PVR, and the step of receiving object information includes receiving the object information from one of the following: a broadcast transmission, and the storage device of the PVR.

Further in accordance with a preferred embodiment of the present invention there is provided a display device including a receiver receiving background video including a multiplicity of video frames, at least one of the multiplicity of video frames including a plurality of sub-pictures, each of the plurality of sub-pictures representing an alternative background, and a processor switching between a first sub-picture of the plurality of sub-pictures and a second sub-picture of the plurality of sub-pictures, and rendering the second sub-picture for display.

Also in accordance with a preferred embodiment of the present invention there is provided a display device including a receiver receiving background video, and object information that includes information determining an object, a processor computing an adjustable sliding window display frame around the object and upsampling a portion of the background video included in the adjustable sliding window display frame, and an OSD unit overlaying the object over the upsampled portion of the background video.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
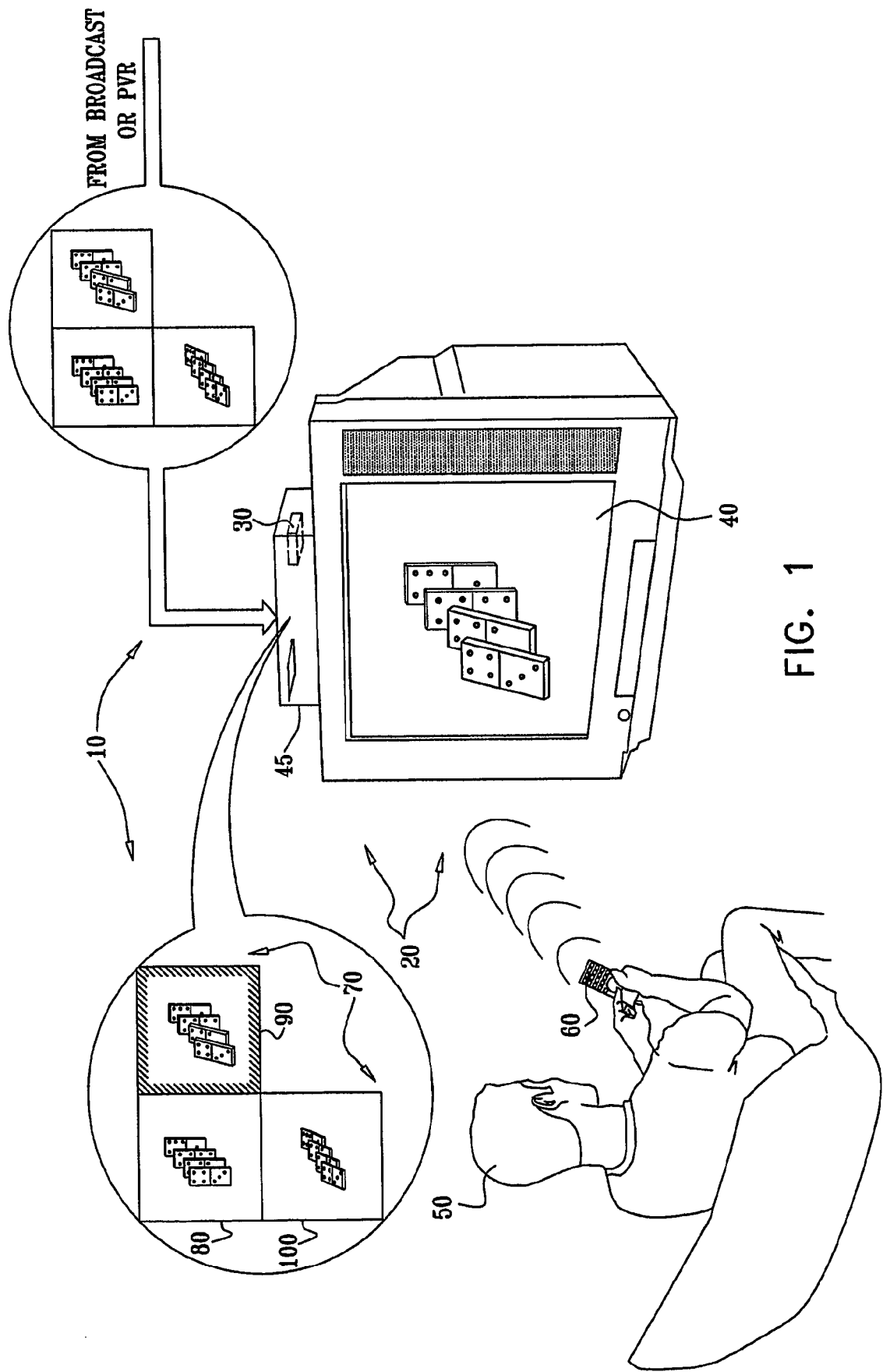
FIG. 1 is a simplified partly pictorial partly block diagram illustration of an interactive system utilizing a first interactive application, the interactive system being constructed and operative in accordance with a preferred embodiment of the present invention.

Reference is now made to FIG. 1 which is a simplified partly pictorial partly block diagram illustration of an interactive system 10, the interactive system 10 being constructed and operative in accordance with a preferred embodiment of the present invention. The interactive system 10 is shown in FIG. 1 utilizing a first interactive application.

The interactive system 10 preferably provides to a user unit 20 or a plurality of user units 20 at least one of the following: television programing including pay and/or non-pay television programming; multimedia information; an electronic program guide (EPG); audio programs; data; games; and information from computer based networks such as the Internet.

For simplicity of depiction and description, and without limiting the generality of the foregoing, only one user unit 20 is illustrated in FIG. 1 and referred to below. The user unit 20 may preferably include a display device 30 and a display 40. The display 40 may comprise any appropriate display such as a television or a computer monitor. The display device 30 may preferably be comprised in a set-top box (STB) that is operatively associated with the display 40. Alternatively, the display device 30 may be comprised in a cellular telephone (not shown) or in any appropriate personal digital device capable of video reception and display (not shown), in which case the display 40 may preferably comprise a display of the cellular telephone or a display of the personal digital device respectively.

By way of example, in FIG. 1 the display device 30 is depicted as comprised in an STB 45 that is situated on top of the display 40, and the display 40 is depicted as comprising a television display. The STB 45 may, for example, additionally include conventional circuitry (not shown) for processing and displaying broadcast transmissions and a conventional access control device, such as a smart card (not shown) for allowing conditional access to at least a portion of the broadcast transmissions.

The user unit 20 may preferably be operated by a user 50, for example via a remote control (RC) 60.

In operation, the user unit 20 may receive programming material and information for displaying on the display 40. The programming material and the information may preferably be broadcast to the user unit 20 as regular scheduled transmissions or in the form of video-on-demand (VOD) or near video-on-demand (NVOD) transmissions. Alternatively or additionally, the programming material and the information may preferably be supplied by a personal video recorder CPVR) (not shown in FIG. 1), such as an XTV™ system, commercially available from NDS Limited, One London Road, Staines, Middlesex, TW18 4EX, United Kingdom.

The programming material and the information received at the user unit 20 preferably refer to the first interactive application that may, for example and without limiting the generality of the present invention, include a first game application, a simplified example of which is shown in FIG. 1. In such a case, the programming material and the information received at the user unit 20 may is preferably include background video comprising a multiplicity of video frames. Preferably, at least one of the video frames includes a plurality of sub-pictures, each sub-picture representing an alternative background. By way of example, in FIG. 1 only a single video frame 70 is depicted with three sub-pictures 80, 90 and 100, each of the three sub-pictures 80, 90 and 100 representing an alternative background. However, it is appreciated that additional video frames of the multiplicity of video frames may preferably include various numbers of sub-pictures that represent various and different alternative backgrounds.

Further by way of example, the alternative backgrounds represented by the three sub-pictures 80, 90 and 100 refer to different positions of an arrangement of adjacent domino blocks that may, for example, comprise part or all of a game background. Sub-picture 80 represents a state in which all the background domino blocks are standing one after the other, sub-picture 100 represents a state in which all the background domino blocks have fallen, and sub-picture 90 represents an intermediate state in which some of the background domino blocks are standing while other background domino blocks have already fallen.

The user 50 preferably operates the RC 60 to play the first game application. At a certain time during playing of the first game application, the game background may, for example, refer to the state in which all the background domino blocks are standing one after the other. In such a case, the display device 30 preferably upsamples the sub-picture 80 and displays on the display 40 the sub-picture 80 upsampled to a full screen of the display 40. The user 50 will then be able to view on the display 40 only domino blocks that are standing one after the other.

The term "upsample", in all of its grammatical forms, is used throughout the present specification and claims to refer to a display operation in which a portion of a received video image is presented in a larger form, typically, but not necessarily, filling a full screen of a display.

As the first game application proceeds, the game background may need to change due to, for example, an action of the user 50 or an instruction from the first game application. In such a case, the display device 30 preferably switches between a first sub-picture of the plurality of sub-pictures and a second sub-picture of the plurality of sub-pictures. Preferably, the switching comprises seamlessly switching between the first sub-picture and the second sub-picture.

It is appreciated that the first sub-picture may correspond to a first perspective view of a scene and the second sub-picture may correspond to a second perspective view of the scene. The first perspective view may be different from the second perspective view. It is further appreciated that at least one of the first sub-picture and the second sub-picture may include a 3-dimensional (3D) scene.

By way of example, and without limiting the generality of the present invention, when the change is to be effected, the first sub-picture is taken to be the sub-picture 80 and the second sub-picture is taken to be the sub-picture 90; switching at the display device 30 occurs between the sub-picture 80 and the sub-picture 90. Preferably, the display device 30 upsamples the sub-picture 90 after the switching. Upsampling of the sub-picture 90 may, for example, include upsampling of the sub-picture 90 to a full video frame, preferably for displaying on the display 40. The display device 30 then preferably displays on the display 40 the sub-picture 90 upsampled to a full screen of the display 40 as shown in FIG. 1.

Persons skilled in the art will appreciate that once the video frame 70 is decoded all the sub-pictures 80, 90 and 100 are also decoded and made ready for display. The switching between the sub-pictures 80 and 90 is an operation that may simply be made by pointing to the sub-picture 90. Thus, the switching operation may be performed very quickly to provide a seamless switching visual effect. The upsampling is also an operation that may typically be performed very quickly. Therefore, the switching in combination with the upsampling are preferably performed with frame-accuracy, that is, no glitches occur and the switching is synchronized with rendering of the upsampled sub-picture 90 to avoid visual impairment. By contrast, if the background video were provided in separate frames, switching between the frames would have been noticeable by a viewer.

The term "render" is used, in all its grammatical forms, throughout the present specification and claims to refer to any appropriate mechanism or method of making content palpable to one or more of the senses. In particular and without limiting the generality of the foregoing, "render" refers not only to display of video content but also to playback of audio content.

The interactive system 10 provides a configuration with improved capabilities for handling interactive applications as described below. The configuration provided by the interactive system 10 is suitable for execution of various types of interactive applications and is particularly useful for execution of interactive applications that employ and handle rich multimedia in cases where processing capabilities of the display device 30 are limited with respect to processing capabilities of, for example, dedicated game machines, such as the following well known dedicated game machines: XBOX™, commercially available from Microsoft Corporation of USA; PlayStation™ 2, commercially available from Sony Corporation of Tokyo, Japan, and GameCube™, commercially available from Nintendo Co., Ltd., of Kyoto, Japan. It is appreciated that in many conventional interactive television systems existing today processing capabilities of STBs are typically limited with respect to processing capabilities of dedicated game machines.

Interactive applications typically include interactive games, EPG applications, gambling applications, shopping applications, interactive television applications, etc. For simplicity of description, only interactive game applications, which typically employ and handle rich multimedia, are referred to herein, it being appreciated that the present invention is not limited to interactive game applications and rather any other appropriate types of interactive applications may alternatively be executed in the interactive system 10.

Figure 2:
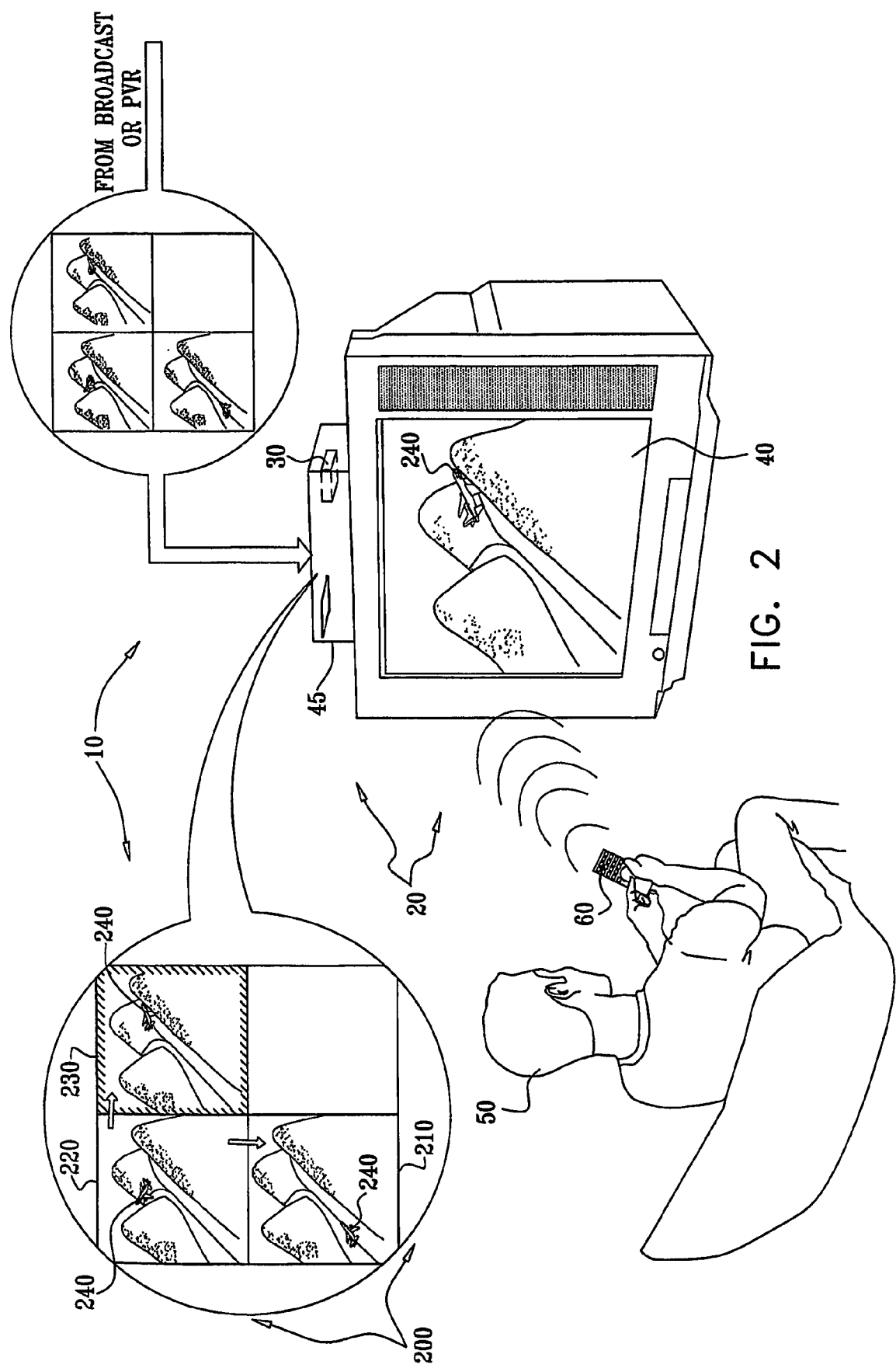
FIG. 2 is a simplified partly pictorial partly block diagram illustration of the interactive system of FIG. 1 utilizing a second interactive application.

Reference is now made to FIG. 2 which is a simplified partly pictorial partly block diagram illustration of the interactive system 10 of FIG. 1 utilizing a second interactive application. The second interactive application preferably includes a second game application, a simplified example of which is shown in FIG. 2.

Preferably, the user unit 20 receives programming material and information from a broadcast transmission and/or from a storage device (not shown) of a PVR (not shown). The programming material and the information preferably include background video for the second game application. The background video for the second game application preferably includes a multiplicity of video frames, and at least one of the video frames preferably includes a plurality of sub-pictures, each of the plurality of sub-pictures representing an alternative background. By way of example, in FIG. 2 only a single video frame 200 is depicted with three sub-pictures 210, 220 and 230, each of the three sub-pictures 210, 220 and 230 representing an alternative background. However, it is appreciated that additional video frames of the multiplicity of video frames may preferably include various numbers of sub-pictures that represent various and different alternative backgrounds.

The alternative backgrounds represented by the three sub-pictures 210, 220 and 230 may, by way of example, refer to different paths of flight of an object, such as a plane 240 flying along canyons and between mountains as well as, for example, to the plane 240 and to flying states of the plane 240 such as roll, pitch, or yaw of the plane 240. Sub-picture 210 may represent the plane 240 flying along a valley between mountains, sub-picture 220 may represent the plane 240 taking a turn to the left at a turning point at the end of the valley, and sub-picture 230 may represent the plane 240 taking a turn to the right at the turning point at the end of the valley. It is appreciated that at least one of the sub-pictures 210, 220 and 230 may include a 3D scene.

In operation, the user 50 preferably operates the RC 60 to play the second game application, for example, by determining a path of flight of the plane 240 along the canyons and between the mountains and avoiding collisions between the plane 240 and canyon walls or the mountains. The sub-picture 210 is preferably upsampled and displayed on the full screen of the display 40 for a period of time in which the plane 240 flies along the valley between the mountains. When the plane 240 reaches the turning point at the end of the valley, the user 50 may, for example, choose a turn to the right in which case the display device 30 preferably switches between a first sub-picture of-the plurality of sub-pictures and a second sub-picture of the plurality of sub-pictures, and particularly between the sub-picture 210 and the sub-picture 230. Preferably, switching between the sub-picture 210 and the sub-picture 230 includes seamlessly switching between the sub-picture 210 and the sub-picture 230.

Preferably, the display device 30 upsamples the sub-picture 230 after the switching. Upsampling of the sub-picture 230 may, for example, include upsampling of the sub-picture 230 to a full video frame, preferably for displaying on the display 40. The display device 30 then preferably displays on the display 40 the sub-picture 230 upsampled to a full screen of the display 40 as shown in FIG. 2.

Persons skilled in the art will appreciate that once the video frame 200 is decoded all the sub-pictures 210, 220 and 230 are also decoded and made ready for display. The switching between the sub-pictures 210 and 230 is an operation that may simply be made by pointing to the sub-picture 230. Thus, the switching operation may be performed very quickly to provide a seamless switching visual effect. The upsampling is also an operation that may typically be performed very quickly. Therefore, the switching in combination with the upsampling are preferably performed with frame-accuracy, that is, no glitches occur and the switching is synchronized with rendering of the upsampled sub-picture 230 to avoid visual impairment. By contrast, if the background video were provided in separate frames, switching between the frames would have been noticeable by a viewer.

Figure 3:
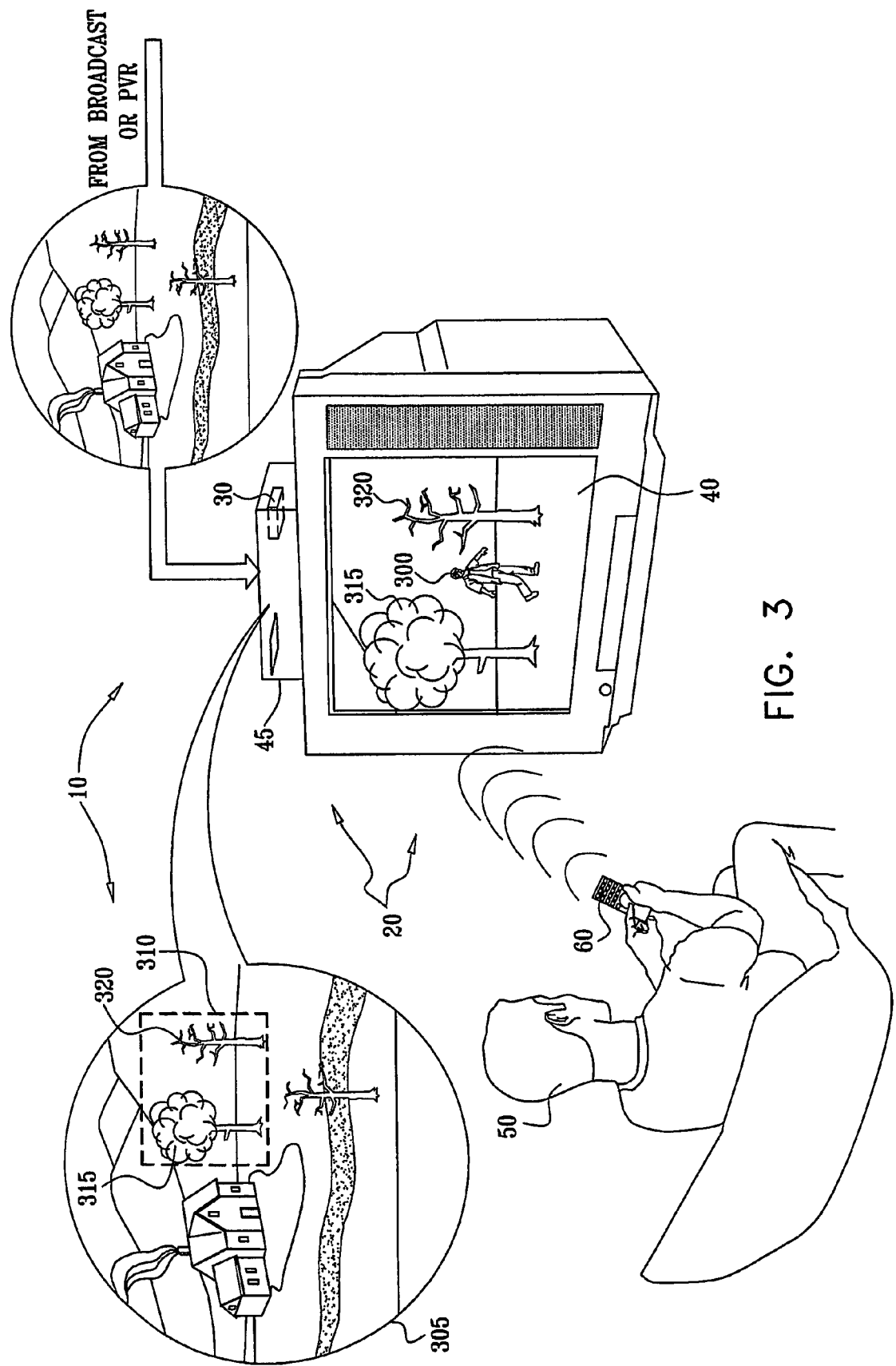
FIG. 3 is a simplified partly pictorial partly block diagram illustration of the interactive system of FIG. 1 utilizing a third interactive application.

Reference is now made to FIG. 3 which is a simplified partly pictorial partly block diagram illustration of the interactive system 10 of FIG. 1 utilizing a third interactive application. The third interactive application preferably includes a third game application, a simplified example of which is shown in FIG. 3.

Preferably, the user unit 20 receives programming material and information that include background video for the third game application and object information for the third game application. The object information preferably includes information determining an object 300. The object 300 preferably includes a game object. By way of example, the object 300 may include a depiction of a person. It is appreciated that the programming material and the information may be received from a broadcast transmission and/or from a storage device (not shown) of a PVR (not shown).

In operation, the user 50 preferably operates the RC 60 to play the third game application by; for example, guiding the object 300 and/or enabling the object 300 to perform actions while walking through a landscape view presented in a video frame 305 of the background video.

Preferably, the display device 30 computes an adjustable sliding window display frame (a viewport) 310 around the object 300. In FIG. 3, the adjustable sliding window display frame 310 around the object 300 covers, by way of example and without limiting the invention, a portion of the background video that includes two trees 315 and 320. The display device 30 preferably upsamples the portion of the background video comprised in the adjustable sliding window display frame 310 and overlays the object 300 over the upsampled portion of the background video. The user 50 is then able to view the object 300, that is, the person walking between the two trees 315 and 320, on the display 40.

As the game proceeds, the depiction of the person may move, either in response to commands from the user 50 or in response to instructions from the third game application. The adjustable sliding window display frame 310 may, for example, be computed to always surround the person and to display only background portions along a path followed by the depiction of the person thus realistically simulating the person advancing along the path and passing different landscape elements.

Persons skilled in the art will appreciate that the adjustable sliding window display frame 310 may, for example, enable fast tracking of the depiction of the person because once the video frame 305 is decoded, the adjustable sliding window display frame 310 may be moved very quickly and upsampling of the portion of the background video comprised in the adjustable sliding window display frame 310 may also be made very quickly to provide a visual effect of seamlessly tracking the depiction of the person. By contrast, if the background video were provided in separate frames, tracking of the depiction of the person would have been noticeable by a viewer.

Figure 4:
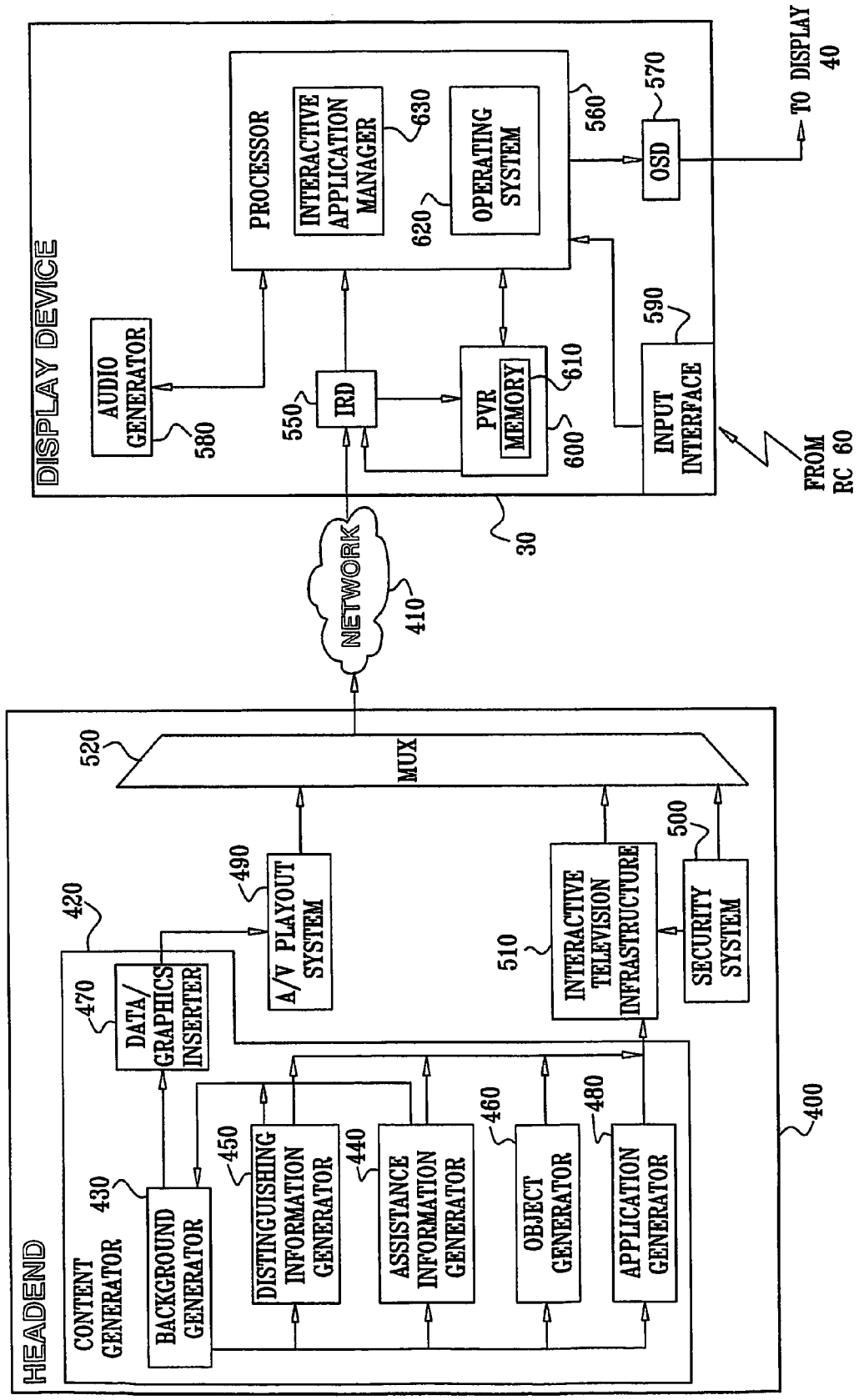
FIG. 4 is a simplified partly pictorial partly block diagram illustration of a preferred implementation of the interactive system of FIG. 1 and a broadcast source transmitting to the interactive system of FIG. 1.

Reference is now additionally made to FIG. 4 which is a simplified partly pictorial partly block diagram illustration of a preferred implementation of the interactive system 10 of FIG. 1 and a broadcast source transmitting to the interactive system 10 of FIG. 1.

The broadcast source may preferably include a headend 400 that communicates with the display device 30 (FIG. 1) via a one-way or two-way communication network 410 that may include at least one of the following: a satellite based communication network; a cable based communication network; a conventional terrestrial broadcast television network; a telephony based communication network; a telephony based television broadcast network; a mobile-telephony based television broadcast network; an Internet Protocol (IP) television broadcast network; and a computer based communication network. An example of an appropriate telephony or IP based television broadcast network includes, for example, a Synamedia™ system, commercially available from NDS Limited, One London Road, Staines, Middlesex, TW18 4EX, United Kingdom.

It is appreciated that the communication network 410 may, for example, be implemented by a one-way or two-way hybrid communication network, such as a combination cable-telephone network, a combination satellite-telephone network, a combination satellite-computer based communication network, or by any other appropriate network.

Physical links in the network 410 may be implemented via optical links, conventional telephone links, radio frequency (RF) wired or wireless links, or any other suitable links.

It is appreciated that the headend 400 may communicate with a plurality of display devices 30 of user units 20 (FIG. 1) via the communication network 410. Additionally or alternatively, a plurality of headends 400 may communicate with a single display device 30 or with a plurality of display devices 30 via the communication network 410. For simplicity of depiction and description, and without limiting the generality of the invention, only one display device 30 and a single broadcast source comprising the headend 400 are illustrated in FIG. 4 and referred to below as communicating via the network 410.

The headend 400 preferably includes a content generator 420 that preferably includes the following elements: a background video generator 430; an assistance information generator 440; a distinguishing information generator 450; an object generator 460; a data/graphics inserter 470; and an application generator 480. The headend 400 also preferably includes the following elements: an audio/video (A/V) playout system 490; a security system 500; interactive television infrastructure 510; and a multiplexer (MUX) 520. The interactive television infrastructure 510 may preferably include conventional interactive television infrastructure such as, for example, the interactive television infrastructure Value@TV™, commercially available from NDS Limited of One London Road, Staines, Middlesex, TW18 4EX United Kingdom, which is described at the World Wide Web site www.nds.com/interactive_tv/interactive_tv.html, the disclosure of which is hereby incorporated herein by reference.

It is appreciated that the elements of the headend 400 may preferably be implemented in any appropriate combination of hardware and software. Particularly, the background generator 430, the assistance information generator 440, the distinguishing information generator 450, the object generator 460, and the data/graphics inserter 470 may be implemented in software, or in hardware, or in any appropriate combination of hardware and software. For example, conventional software tools may be used for generation and editing of background video materials, and assistance information and distinguishing information may be extracted from the generated and edited background video materials. It is appreciated that for the generation and editing of the background video materials the software tools may, for example, use 2-dimensional (2D) and/or 3D modeling, image compositing, and tracking.

The software tools may, for example, include animation tools, such as, for example, Discreet™'s 3ds max™ which is described at the World Wide Web site www.discreet.com/3dsmax, Alias™'s Maya™ which is described at the World Wide Web site www.alias.com, and SoftimagelXSI which is described at the World Wide Web site www.softimage.com. Alternatively or additionally, the software tools may include compositing and video post tools, such as, for example, Discreet Combustion™ which is described at the World Wide Web site www.discreet.com, Pinnacle Commotion which is described at the World Wide Web site www.pinnaclesys.com, Adobe After Effects software which is described at the World Wide Web site www.adobe.com, and Avid Media Composer, and Avid Xpress that are described at the World Wide Web site www.avid.com.

The content generator 420 preferably provides video and audio content to the A/V playout system 490 that preferably provides the video and audio content in a format packaged for delivery via the network 410 to the MUX 520. The content generator 420 may specifically enable insertion, as required, of timing (T) information or private data into video and audio content for subsequent playout by the A/V playout system 490.

The background generator 430 may preferably provide background video and audio for an interactive application, as well as timing information for the interactive application, to the AN playout system 490, for example via the data/graphics inserter 470. It is appreciated that in certain configurations of the headend 400, the background generator 430 and the data/graphics inserter 470 may be comprised in the A/V playout system 490.

The AN playout system 490 may include any standard studio equipment, such as a video server. Alternatively, and particularly in a case where the background video and audio are dynamically changing, it may include a compressor and an MPEG encoder (MPEG—Motion Picture Experts Group), or a computer, such as a personal computer (PC), that runs a game application (Game Engine) and includes a graphics card capable of synthesizing in real time an output in a television (TV) format. The MPEG encoder may preferably include at least one of the following: an MPEG2 encoder; and an MPEG4 encoder.

The compressor may preferably include any appropriate compressor that compresses the background video and audio in any appropriate digital A/V compression format which is supported by the display device 30 and is capable of carrying timing information, or private data containing timing information, attached to specific frames. Examples of appropriate compression products utilizing appropriate compression formats include Windows Media Player™, commercially available from Microsoft™ Corporation, and the Real compression products, commercially available from RealNetworks, Inc.

The application generator 480 preferably provides the interactive application and operating data regarding the interactive application to the infrastructure 510. The infrastructure 510 may apply security information received from the security system 500 to the interactive application and prepare the interactive application in a format suitable for transmission to the display device 30 via the network 410.

Referring back to FIG. 1, the timing information is preferably required for synchronization of the background video and audio to the interactive application when the interactive application is executed by the display device 30. It is appreciated that conventional video sources typically provide video and audio in a synchronized form as is well known in the art and therefore it is sufficient to synchronize the interactive application to the background video.

Synchronization of the background video to the interactive application running in the display device 30 may be carried out in various ways. Preferably, the background video is tagged with a reference that may be used by the interactive application to trigger an internal frame related event. If the interactive application comprises an interactive game application, the interactive game application must, for example, be able to lookup boundary information about the background and determine whether, for example, an object in the interactive application has drifted into a forbidden area on the display 40 (FIG. 1); that is every frame or every few frames the interactive game application must be able to determine which video frame is currently decoded for display on the display 40 and use a time reference to look up appropriate related boundary data.

The time reference may be obtained in various ways. For example, if the background video is compressed and MPEG encoded, such as by MPEG2 coding, an MPEG timecode as is well known in the art is typically embedded in a group of pictures (GOP) header and transmitted within an MPEG background video transmission. The timecode may then be extracted at the display device 30 to provide the time reference that is related to a current video frame.

It is appreciated that MPEG2 PCR (Program Clock Reference) and PTS (Presentation Time Stamp) can also be used to generate a timecode for each video frame. The PCR typically provides an overall clock reference for the interactive application and the PTS typically defines a presentation time of each video frame. By transmitting a PCR value of a known video frame, PTS offsets can be calculated and used to reference boundary data associated with a current background video frame. Such calculations are well known in the art of Digital Video Broadcasting (DVB) for calculation of Normal Play Time (NPT) as described, for example, in the above mentioned document ISO/IEC-13818-6, MPEG DSM-CC specifications, July 1999, the disclosure of which is hereby incorporated herein by reference.

It is appreciated that in interactive audio-only applications the PCR may be used for synchronization of the interactive application to the audio.

If the background video comprises analog video, the conventional vertical blanking interval (VBI) of a transmitted video signal may preferably be used to carry the time reference. It is appreciated that transport of VBI data is also typically provided in digital television systems to support features of an incumbent analog video, and since the VBI data is frame related, the VBI data may be used to carry a frame reference from the headend 400 to the display device 30. It is appreciated that any VBI line may be used, but typically, VBI lines that are used for Vertical Interval Timecode or for Teletext lines are employed. Teletext supports private data carriage, and is therefore capable of transporting a data value representing a timecode for each frame.

For some systems, timing information may be sent out-of-band as part of data transmission. Such timing information is typically considered less accurate than, for example, timing information provided by any of the above mentioned MPEG timecode, MPEG PCR and PTS, and VBI data. However, implementation of out-of-band timing information transmission may be easier. It is appreciated that an inferior accuracy of the timing information in out-of-band timing information transmission may limit a type or complexity of interactive applications that may be used.

It is appreciated that the present invention is not limited by a way in 10 which the time reference is obtained, and other appropriate ways may alternatively or additionally be used for obtaining the time reference.

Referring again to FIG. 4, the assistance information generator 440 preferably generates assistance information for the interactive application and provides the assistance information to the infrastructure 510 which preferably processes the assistance information into a format packaged for delivery via the network 410. Additionally, the assistance information generator 440 may provide at least part of the assistance information to the background generator 430 for inclusion as in-video masks.

The term "assistance information" is used throughout the present specification and claims to include information related to a background video and audio that is used to create interactive elements enabling an interactive application to be carried out.

The term "in-video mask" is used throughout the present specification and claims to refer to a video bitmap sequence which mirrors a displayable video, but which is set up to provide control information to an interactive application instead of providing displayable information. An in-video mask may, for example, carry boundary information for a current displayable frame. In a video frame that includes a plurality of displayable sub-pictures, in-video masks may be carried as one of the sub-pictures.

The assistance information may, for example, include at least one of the following: area assistance information related to the background video; boundary assistance information related to the background video; non-boundary assistance information; and information that accompanies one of the following: the area assistance information; the boundary assistance information; and the non-boundary assistance information. The term "area assistance information" is used throughout the present specification and claims to include assistance information related to an area in video frames of the background video.

The non-boundary assistance information may preferably include at least one of the following: physics information; lighting information; at least one alpha mask; information on at least one target zone; information on at least one dead zone; information regarding at least one game specific area; control information; and preferred track information.

The term "physics information" is used throughout the present specification and claims to refer to information on how a local graphical object behaves when it hits, or collides with or interacts with another object in a background video. An example of physics information includes information about interactions with a round "bumper" provided in a television pinball game; a local graphical "ball" object typically bounces off the bumper with a speed and direction that depends on how the bumper is hit. A physical force vector, comprising direction and magnitude, may, in such a case, be part of the physics information.

The term "lighting information" is used throughout the present specification and claims to refer to information on how illumination is distributed in a region of a background video. The lighting information may, for example, be used to change an appearance of a local object when the local object approaches bright objects in the background video.

The term "alpha mask" is used throughout the present specification and claims to refer to a bitmap that defines an image area that is visible on a display on a pixel-by-pixel basis. The image area may typically range from completely visible through partially transparent to not visible at all. The alpha mask may, for example, be used to partially or fully occlude a local graphical object to give an illusion of the local graphical object going behind one or more video objects.

In a case where the non-boundary assistance information includes at least one alpha mask or any other type of in-video mask, the assistance information generator 440 may preferably provide the at least one alpha mask or the other type of in-video mask to the background generator 430 for transmission to the display device 30 in a format packaged for delivery via the network 410.

The term "target zone" is used throughout the present specification and claims to refer to an area that is a target for an interactive application. For example, in an interactive game application that includes a football game, a target may be a goal area.

The term "dead zone" is used throughout the present specification and claims to refer to an area, typically in an interactive game application, in which an interactive object, such as a game object, experiences an operation that typically has a pre-defined effect on execution of the interactive application, such as ending of a round in the interactive application. For example, in an interactive application that includes a shooting game, a dead zone may be an area where a fireball has just landed on a playing object.

The term "game specific area" is used throughout the present specification and claims to refer to an area in an interactive game application that provides a specific functionality for the interactive game application. For example, a game specific area may include a teleportation area in which a game object may be maneuvered. In an interactive shooting game application a game specific area may, for example, include an area in which a game object may reload ammunition or an area in which the game object may refuel.

The term "control information" is used throughout the present specification and claims to refer to any type of control that an interactive application requires. The control may refer to availability of any of the following: video; audio; on-screen display (OSD); multimedia information; and data related to the interactive application.

Alternatively or additionally, the control may refer to remote control of objects in the interactive application, for example by the headend 400. Further alternatively or additionally, the control may refer to availability of different data sets on a time basis. For example, the control may enable or disable downloading of data sets that alter complexity of the interactive application or alter an execution mode of the interactive application.

In interactive applications in which an adjustable sliding window display frame is used, the control information may, for example, include information indicating when the adjustable sliding window display frame is available. In such interactive applications, the control information may alternatively or additionally include information relating to the adjustable sliding window display frame, such as, for example, at least one of the following: a size of the adjustable sliding window display frame; areas in the background video where the adjustable sliding window display frame may be computed; and an axis origin point from which the adjustable sliding window display frame may be computed.

The term "preferred track information" is used throughout the present specification and claims to refer to information regarding the "best track" through, for example, a maze.

The distinguishing information generator 450 preferably generates distinguishing information for the interactive application and provides the distinguishing information to the infrastructure 510 which preferably processes the distinguishing information into a format packaged for delivery via the network 410. Additionally, the distinguishing information generator 450 may provide at least part of the distinguishing information to the background generator 430 for inclusion as in-video masks. The term "distinguishing information" is used throughout the present specification and claims to include information that distinguishes portions of a background video, such as, for example, sub-pictures and image areas, by at least one characteristic. The at least one characteristic may preferably include at least one of the following: a lighting characteristic; a physics characteristic; an alpha mask characteristic; a target characteristic; a dead zone characteristic; a characteristic of a game specific area; a preferred track characteristic; and a track-control characteristic.

It is appreciated that the distinguishing information may include control information particularly in cases where the control information includes information indicating locations where switching between sub-pictures as mentioned above with reference to FIGS. 1 and 2 is available, and criteria that have to be met for the switching between the sub-pictures to be carried out.

In a preferred embodiment of the present invention the distinguishing information generator 450 may be comprised in the assistance information generator 440 and the distinguishing information may be comprised in the assistance information.

The lighting characteristic may, for example, include a parameter provided in the lighting information mentioned above and the physics characteristic may, for example, include a parameter provided in the physics information mentioned above. Similarly, the alpha mask characteristic may, for example, include a parameter provided in the at least one alpha mask mentioned above, the target characteristic may, for example, include a parameter provided in the information on the at least one target zone that is mentioned above, the dead zone characteristic may, for example, include a parameter provided in the information on the at least one dead zone that is mentioned above, and the characteristic of the game specific area may, for example, include a parameter provided in the information regarding the at least one game specific area that is mentioned above. Further similarly, the preferred track characteristic may, for example, include a parameter provided in the preferred track information mentioned above and the track-control characteristic may, for example, include a parameter provided in the control information mentioned above. It is appreciated that the interactive application may use any one of the parameters mentioned above, for example, to determine a sub-picture for rendering.

The distinguishing information may preferably include at least one of the following: at least one in-video mask; and interactive application data. The at least one in-video mask may preferably distinguish between at least one of the following: boundary regions in the background video; and collision regions in the background video. The at least one in-video mask may preferably include at least one of the following: at least one alpha mask; at least one target; at least one dead zone; tracking information; and control information. The tracking information may, for example, include the preferred track information.

The object generator 460 preferably generates object information for the interactive application. The object information preferably includes information determining an object which is preferably included in the interactive application. The object generator 460 preferably provides the object information to the infrastructure 510 which preferably processes the object information into a format packaged for delivery via the network 410.

In certain interactive applications, the object information may include at least one video patch. The term "video patch" is used throughout the present specification and claims to refer to video information that refers to a video representation of a moving object that is to be displayed within a video scene.

It is appreciated that at least some of the information provided to the infrastructure 510 and the A/V playout system 490 may be encrypted in an encryptor (not shown) for access control, and the security information provided by the security system 500 may, for example, include entitlement control messages and control words for providing conditional access to the interactive application as is well known in the art. The infrastructure 510 and the AN playout system 490 preferably output to the MUX 520 information for transmission to the display device 30 in a format packaged for delivery via the network 410.

It is appreciated that the security system 500 may also preferably protect at least part of the timing information before transmission to the display device 30 as described, for example, in a UK patent application of NDS Limited, filed 26 Jan. 2004 and entitled "Timeline Protection", and in a corresponding US Provisional Patent Application of David White, filed 27 Jan. 2004 and entitled "Timeline Protection", the disclosures of which are hereby incorporated herein by reference. Protection of the at least part of the timing information may, for example, be useful in preventing or making difficult removal of, skipping or otherwise tampering with advertising material by users where the advertising material is inserted in or associated with the interactive application.

The MUX 520 preferably multiplexes video, audio and data provided by the infrastructure 510 and the AN playout system 490 and outputs multiplexed program transmissions for transmission to the display device 30 via the network 410. The program transmissions may preferably include at least one of the following: television programming including pay and/or non-pay television programming; interactive television programming and applications such as, for example, interactive games and interactive gambling games; multimedia information; an EPG; audio programs; data; games; and information from computer based networks such as the Internet.

It is appreciated that non-ANV program transmissions may preferably be transmitted either as out-of-band transmissions, such as data carousel transmissions, or as in-band transmissions, such as in-video transmissions. In a data carousel transmission, the assistance information, the distinguishing information and the object information are preferably provided to the network 410 by the infrastructure 510 as a package of data. Preferably, a transmission carousel as is well known in the art is used to transmit the package of data cyclically and continuously via the network 410 so that the package of data will be available to the display device 30 whenever the interactive application is available for execution at the display device 30. It is appreciated that the package of data may be packaged in any appropriate way, for example, as described in the above-mentioned UK Patent Application of NDS Limited, filed 30 Jan. 2004 and entitled "Apparatus and Methods for Transmitting and Handling Game Capabilities in a Broadcast Network", and the corresponding US Provisional Patent Application of Ian R. Shelton et al, filed 2 Feb. 2004 and entitled "Apparatus and Methods for Transmitting and Handling Game Capabilities in a Broadcast Network", the disclosures of which are hereby incorporated herein by reference.

In an in-video transmission, the assistance information may preferably be provided to the network 410 by the background generator 430 as a set of video masks that are embedded in video.

It is appreciated that any appropriate hybrid in-video and data carousel transmission may alternatively be used.

Preferably, the multiplexed program transmissions are transmitted to the display device 30 via the network 410 and received at an integrated receiver and decoder (IRD) 550 in the display device 30. The IRD 550 may, for example, include a conventional IRD that receives, demultiplexes, decodes and decrypts/descrambles as necessary the multiplexed program transmissions under control of a conditional access device such as a removable security element (not shown) as is well known in the art. The removable security element may, for example, include a smart card (not shown) as is well known in the art.

In addition to the IRD 550, the display device 30 preferably includes a processor 560, such as, for example, an appropriate video processor as is well known in the art. The display device 30 may additionally include an OSD unit 570. Further additionally, the display device 30 may include the following elements: an audio generator 580; and an input interface 590.

The display device 30 may also include, or be associated with, a PVR 600 that preferably includes a high capacity storage device 610, such as a high capacity memory. The PVR 600 is preferably operatively associated with the IRD 550 and the processor 560.

The IRD 550 preferably includes at least one audio decoder (not shown) and at least one video decoder (not shown). It is appreciated that the PVR 600 may also preferably include at least one audio decoder (not shown) and at least one video decoder (not shown), or alternatively use an audio decoder and a video decoder comprised in the IRD 550, in which case the IRD 550 preferably includes more than one audio decoder and more than one video decoder.

The display device 30 may preferably be implemented in any appropriate combination of hardware and software. It is appreciated that at least some of the elements 550, 560, 570, 580, 590 and 600 may be comprised in a single integrated circuit (IC).

The PVR 600 may preferably record at least some of the program transmissions received at the IRD 550 in the storage device 610 and display recorded program transmissions at a discretion of a user, at times selected by the user, and in accordance with preferences of the user and parameters defined by the user as described, for example, in the above mentioned published PCT Applications WO 00/01149, WO 01/52541 and WO 02/01866 and the above mentioned published U.S. Patent Application US 2003/0163832, the disclosures of which are hereby incorporated herein by reference. The PVR 600 may also preferably enable various trick modes that may enhance viewing experience of users such as, for example, fast forward or fast backward as described, for example, in the above mentioned published PCT Applications WO 03/010970 and WO 01/35669 and the above mentioned U.S. patent application Ser. No. 09/574,096, the disclosures of which are hereby incorporated herein by reference.

It is appreciated that the recorded program transmissions displayed by the PVR 600 typically comprise program transmissions delayed with respect to a time of broadcast of the program transmissions by the headend 400. Therefore, program transmissions that undergo at the IRD 550 decoding, and if necessary, decryption/descrambling, preferably arrive either from broadcast transmissions broadcast by the headend 400 or from the storage device 610 of the PVR 600. The program transmissions may, for example, be broadcast by the headend 400 as regular scheduled transmissions or in the form of VOD or NVOD transmissions. The program transmissions that are decoded and decrypted/descrambled by the IRD 550 typically require processing of a similar type whether provided by the headend 400 or by the PVR 600, or by any other appropriate device in which the program transmissions may be stored, such as a game console or a cellular telephone.

The processor 560 may preferably include an operating system 620 that enables processing of the program transmissions. The processor 560 may also preferably include an interactive application manager 630 for managing processing and displaying of interactive applications provided in the program transmissions.

The input interface 590 preferably accepts user input from an input device such as the RC 60 (FIG. 1) that is operated by the user. The user input is preferably provided to the processor 560 as instructions and an interactive input for the interactive applications provided in the program transmissions.

The operation of the interactive system 10 of FIGS. 1-4 is now briefly described with reference to, for example and without limiting the generality of the present invention, interactive game applications.

Preferably, an interactive game application that enables playing a game is prepared at the headend 400 for transmission to the display device 30. Preparation of the interactive game application preferably depends upon a type of the interactive game application. For example, the preparation of the interactive game application may include preparation of game information including at least one of the following: background video comprising a multiplicity of video frames where at least one of the multiplicity of video frames comprises a plurality of sub-pictures, each of the plurality of sub-pictures representing an alternative background; assistance information that comprises area assistance information; non-boundary assistance information; object information that comprises information determining an object; distinguishing information that distinguishes portions of the background video by at least one characteristic; and background audio.

Preferably, the prepared game information is multiplexed in the MUX 520 and transmitted to the display device 30 in association with the interactive game application. It is appreciated that the prepared game information may be transmitted as at least one of the following: in-video information; data carousel information; and a combination of in-band and out-of-band information. For example, in-video masks comprised in the prepared game information may be transmitted as in-band information, and information provided by the infrastructure 510 may be transmitted as out-of-band information.

At the display device 30, the IRD 550 preferably receives the interactive game application and the prepared game information and provides the interactive game application and the prepared game information to the processor 560, if the interactive game application is to be executed in real-time. If the interactive game application is to be stored for execution at a time after broadcast time of the interactive game application, the IRD 550 preferably provides the interactive game application and the prepared game information to the PVR 600 for storage in the storage device 610. It is appreciated that in a case where the interactive game application and the prepared game information are stored in the storage device 610 of the PVR 600, the interactive game application and the prepared game information may later be retrieved from the PVR 600 for processing by the processor 560 in response to at least one of the following: an input of a user, such as the user 50; timing information; an instruction from the headend 400; and an instruction embedded in the interactive game application.

When the interactive game application is to be executed at the display device 30, the interactive game application and the prepared game information are preferably provided to the processor 560. The processor 560, operated by the operating system 620 in association with the interactive application manager 630, preferably loads up some or all of the assistance information, the distinguishing information and the object information into an internal memory (not shown) thus making the assistance information, the distinguishing information and the object information ready for association with the background video and audio as necessary for playing the game.

As the background video and audio are received at the display device 30, the processor 560 preferably extracts timing information related to the interactive game application and uses the timing information to lookup into the assistance information, the distinguishing information and the object information as necessary in order to synchronize the background video to the interactive game application. The processor 560 then preferably processes the interactive game application using the prepared game information, and renders the processed interactive game application for displaying on the display 40. The processor 560 may be assisted by the audio generator 580 for generation of audio to be rendered. It is appreciated that execution of the interactive game application typically proceeds according to user input received from the user 50 via the input interface 590 of the display device 30.

Preparation of the interactive game application at the headend 400 in the manner described herein preferably reduces processing power required of the processor 560. Thus, various interactive games with various levels of complexity may be played via the display device 30 even if the processing power of the processor 560 is relatively low. An amount and complexity of information received from the headend 400 vs. an amount and complexity of information computed at the display device 30 depends on a type of interactive game applications executed.

In an interactive game application of a first type, the IRD 550 of the display device 30 preferably receives background video comprising a multiplicity of video frames from broadcast transmissions provided by the headend 400 or from program material stored in the storage device 610 of the PVR 600. At least one of the video frames preferably includes a plurality of sub-pictures, each of the plurality of sub-pictures representing an alternative background.

Preferably, the processor 560 switches between a first sub-picture of the plurality of sub-pictures and a second sub-picture of the plurality of sub-pictures. Switching between the first sub-picture and the second sub-picture may preferably include switching between outputs of two audio decoders comprised in the IRD 550. It is appreciated that at least one of the first sub-picture and the second sub-picture may, for example, include a 3D scene.

After the switching, the processor 560 may preferably upsample the second sub-picture, for example, to a full video frame. Upsampling of the second sub-picture is preferably performed for displaying on the display 40. The processor 560 then preferably renders the upsampled second sub-picture for displaying on the display 40.

It is appreciated that the switching between the first sub-picture and the second sub-picture may preferably be performed seamlessly, for example by pointing to the second sub-picture. The upsampling is typically a fast operation. Therefore, the switching in combination with the upsampling are preferably performed with frame-accuracy, that is, no glitches occur and the switching is synchronized with rendering of the upsampled second sub-picture to avoid visual impairment. By contrast, if the background video were provided in separate frames, switching between the frames would have been noticeable by a viewer.

Preferably, the switching between the first sub-picture and the second sub-picture is performed in response to at least one of the following: timing information; user input; an instruction from the headend 400; an instruction from a broadcast source; and an instruction from the interactive game application of the first type.

It is appreciated that the processor 560 may also cause a display effect to be displayed on the display 40. The display effect may preferably be displayed on the display 40 in response to the switching between the first sub-picture and the second sub-picture. The display effect may preferably include at least one of the following: an illusion of an image which is broader than an image displayed before the switching; an illusion of an image which is higher than the image displayed before the switching; an illusion of an image which is broader and higher than the image displayed before the switching; and an illusion of an image which is, with respect to the image displayed before the switching, at least one of the following: horizontally distorted; and vertically distorted.

The interactive game application of the first type may, for example, be represented by the first game application which is shown in FIG. 1 and described above, or by the second game application which is shown in FIG. 2 and described above.

In an interactive game application of a second type, the IRD 550 of the display device 30 preferably receives background video for the interactive game application of the second type either from broadcast transmissions provided by the headend 400 or from program material stored in the storage device 610 of the PVR 600. The IRD 550 also preferably receives object information for the interactive game application of the second type either from broadcast transmissions provided by the headend 400 or from program material stored in the storage device 610 of the PVR 600. The object information preferably includes information that determines an object and the object preferably includes a game object.

It is appreciated that the IRD 550 may use a combination of background video from broadcast transmissions provided by the headend 400 and object information from program material stored in the storage device 610 of the PVR 600, or a combination of background video from program material stored in the storage device 610 of the PVR 600 and object information from broadcast transmissions provided by the headend 400 only if the display device 30 has capabilities for synchronization of the broadcast transmissions provided by the headend 400 and the program material stored in the storage device 610 of the PVR 600.

Preferably, the processor 560 computes an adjustable sliding window display frame around the object and upsamples a portion of the background video comprised in the adjustable sliding window display frame. The adjustable sliding window display frame around the object may, for example, include a CIF resolution CPAL 352×288) portion of the background video, and the CIF resolution portion of the background video may, for example, be upsampled to a full video frame.

The OSD unit 570 preferably overlays the object over the upsampled portion of the background video.

It is appreciated that the processor 560 may preferably move the adjustable sliding window display frame vertically or horizontally across a background video frame, typically, but not necessarily, without the user 50 noticing that the adjustable sliding window display frame is being used. The processor 560 may also use the adjustable sliding window display frame to zoom-in or zoom-out portions of the background video frame, typically under control of the user 50.

Computation of the adjustable sliding window display frame around the object may preferably be used for at least one of the following: tracking the object; altering a portion of the background video which is displayed together with the object; and providing an effect of a change of speed of the background video.

It is appreciated that the effect of a change of speed of the background video refers only to interactive game applications in which the background video scrolls either up/down or left/right and the adjustable sliding window display frame is arranged to scroll up/down or left/right at a different speed or a different direction with respect to the background video. In such a case, although an actual speed of the background video remains unchanged, the user 50 will notice a change of speed of the background video.

The computation of the adjustable sliding window display frame around the object may also preferably be used to create a shudder effect. The term "shudder effect" is used throughout the present specification and claims to refer to an effect in which an adjustable sliding window display frame around an object is moved quickly around the object. The shudder effect may, for example, be used in response to an event, such as the object-being shot.

In a case where the object information includes a video patch, the object preferably comprises a moving object. In such a case, the moving object may be overlaid either by the processor 560 or the OSD unit 570 and the user 50 may notice the object within the adjustable sliding window display frame as moving. The object may be shown moving, for example, by showing the object as suddenly appearing for a short time period and then disappearing or, for example in an interactive shooting game application, by showing the object as suddenly appearing and then "dying" if shot.

Preferably, the video patch includes the object and a transparent surround that can be overlaid over any background shape and color many times. Alternatively, the video patch may include the object with a matching background. It is appreciated that, depending on an application type, the video patch may be controlled by one of the following: user input; control information transmitted from the headend 400; and control information provided by program material stored in the storage device 610 of the PVR 600.

The interactive game application of the second type may, for example, be represented by the third game application which is shown in FIG. 3 and described above. It is appreciated that the present invention, in the embodiment of FIGS. 3 and 4 would, for example, enable a game such as "Sonic the Hedgehog" available on a Sega™ platform, to be played on the display device 30.

Figure 5:
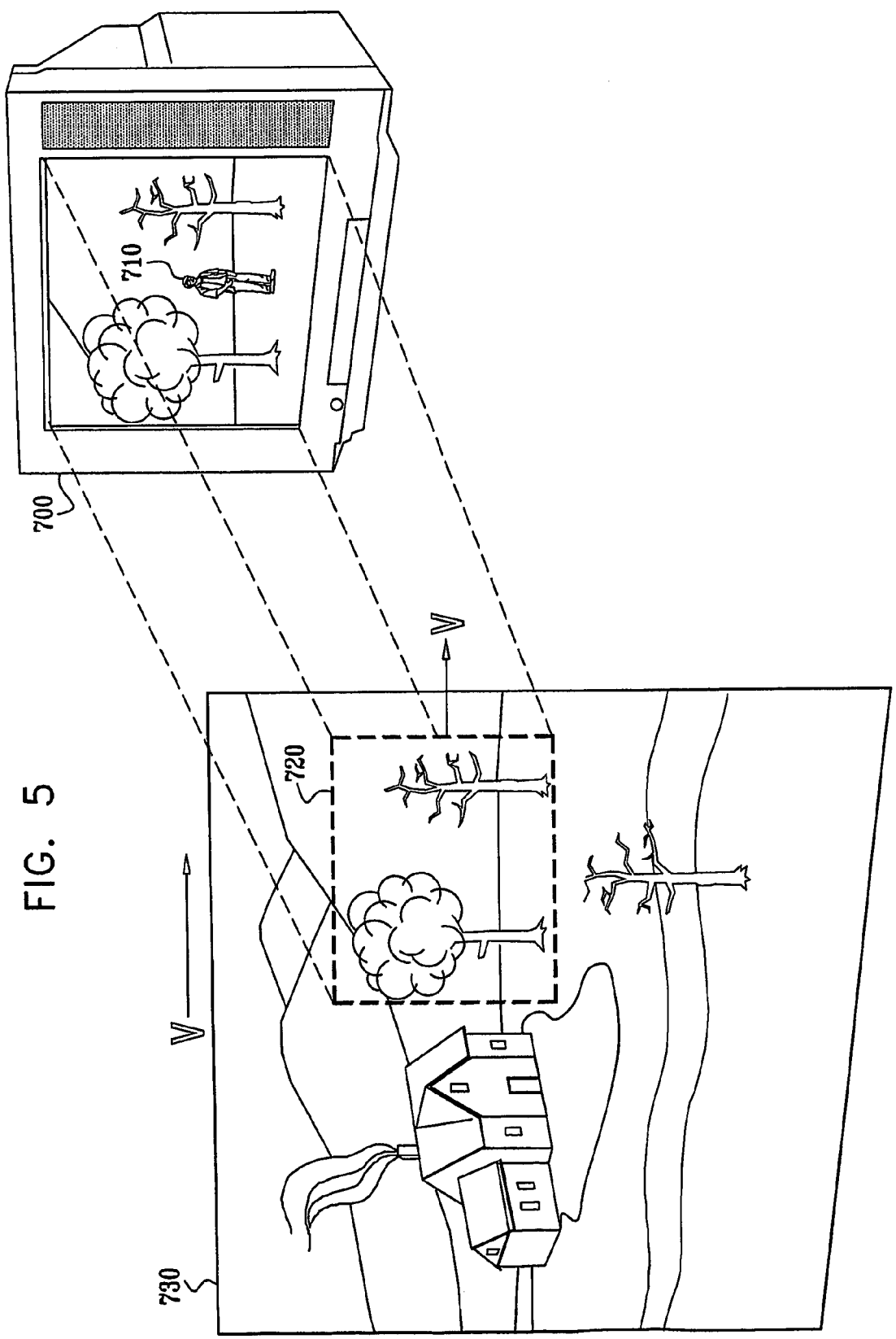
FIG. 5 is a simplified pictorial illustration of an example of a game state in the third interactive application shown in FIG. 3.

Reference is now made to FIG. 5 which is a simplified pictorial illustration of an example of a game state in the third game application described above with reference to FIG. 3.

The game state of the third game application is displayed on a display 700. In the game state, an object, such as a depiction of a person 710, is standing still between background trees. The background trees are preferably comprised in an adjustable sliding window display frame 720. The adjustable sliding window display frame 720 is preferably comprised in a background video 730 which moves at a speed V in some direction, for example, from left to right.

In order to enable display of the person 710 as standing still when the background video 730 moves at the speed V from left to right, the adjustable sliding window display frame 720 is also preferably moved from left to right at the same speed V.

Figure 6:
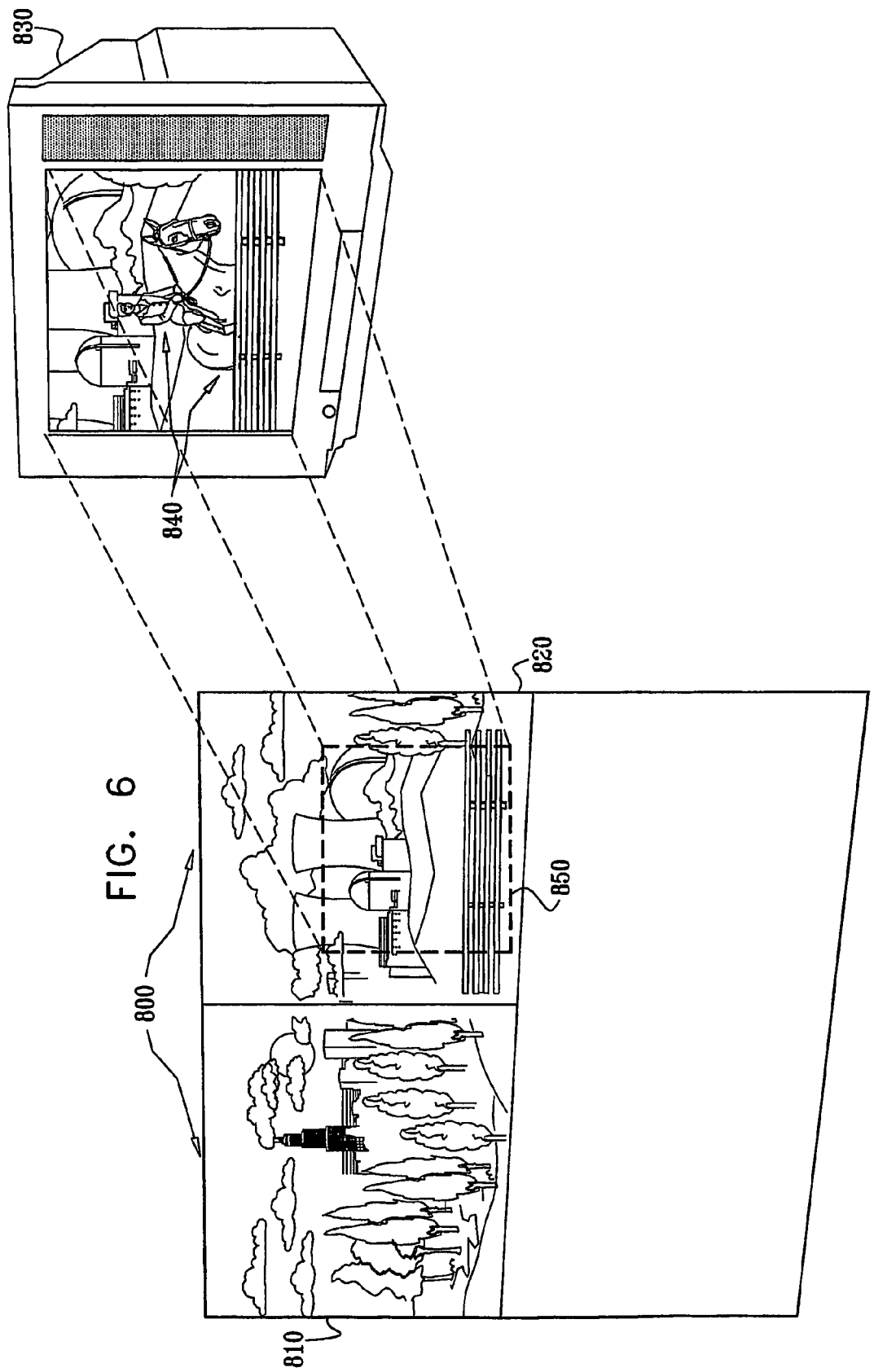
FIG. 6 is a simplified pictorial illustration of an example of a fourth interactive application utilized in the interactive system of FIG. 1.

Reference is now made to FIG. 6 which is a simplified pictorial illustration of an example of a fourth interactive application utilized in the interactive system 10 of FIG. 1. Reference is now additionally made to FIG. 4. The fourth interactive application preferably includes a fourth game application, a simplified example of which is shown in FIG. 6. The fourth game application represents another type of interactive game applications that may be played in the interactive system 10.

The fourth game application is described below with reference to the preferred implementation of the interactive system 10 described above with reference to FIG. 4.

Preferably, in the fourth game application, switching between sub-pictures is used in combination with an adjustable sliding window display frame. The IRD 550 of the display device 30 preferably receives background video for the fourth game application. The background video preferably includes a multiplicity of video frames, at least one of the multiplicity of video frames comprising a plurality of sub-pictures where each of the plurality of sub-pictures represents an alternative background. By way of example and without limiting the invention, a single received background video frame 800 is shown in FIG. 6. The video frame 800 preferably includes a plurality of sub-pictures. By way of example and without limiting the invention, only two sub-pictures 810 and 820 are shown as comprised in the video frame 800.

At a certain time during execution of the fourth game application, a game background may, for example, refer to a background as comprised in the sub-picture 810. In such a case, the processor 560 preferably upsamples the sub-picture 810 to a full video frame for display on a display 830. The OSD 570 preferably overlays an object 840 on upsampled background resulting from upsampling of the sub-picture 810. By way of example, the object 840 in FIG. 6 includes a depiction of a person riding a horse.

As the fourth game application proceeds, the game background may need to change to a background as comprised in the sub-picture 820 due to, for example, the object 840 moving to the right. In such a case, the processor 560 preferably switches between the sub-picture 810 and the sub-picture 820, and upsamples the sub-picture 820 to a full video frame after switching. The OSD 570 preferably overlays the object 840 on upsampled background resulting from upsampling of the sub-picture 820 and renders the object 840 overlaid over the upsampled background.

If, for example, the object 840 is to be tracked when the object 840 moves in the upsampled background resulting from upsampling of the sub-picture 820, the processor 560 preferably computes an adjustable sliding window display frame 850 around the object 840 and upsamples a portion of the background video comprised in the adjustable sliding window display frame 850. The adjustable sliding window display frame 850 around the object 840 may, for example, include a CIF resolution portion of the background video, and the CIF resolution portion of the background video may, for example, be upsampled to a full video frame. The OSD unit 570 then preferably overlays the object 840 over the upsampled portion of the background video comprised in the adjustable sliding window display frame 850. The processor 560 in combination with the OSD unit 570 then preferably render an image including the object 840 overlaid over the upsampled portion of the background video as shown on the display 830 in FIG. 6.

In a case where the object 840 is rendered in a video patch, the object 840 preferably comprises a moving object. The moving object may, for example, comprise the horse moving its head up and down.

Figure 7:
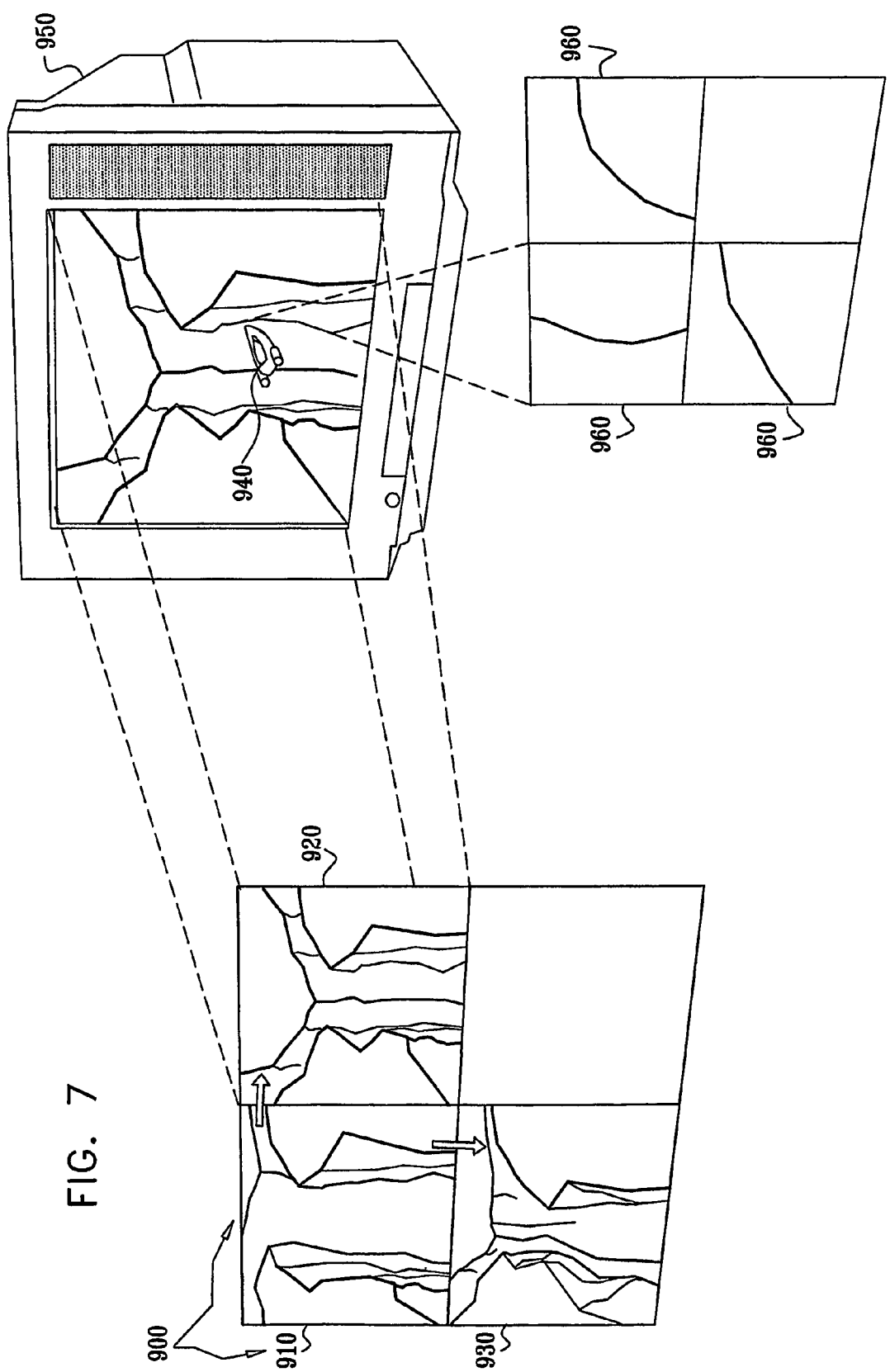
FIG. 7 is a simplified pictorial illustration of an example of a fifth interactive application utilized in the interactive system of FIG. 1.

Reference is now made to FIG. 7 which is a simplified pictorial illustration of an example of a fifth interactive application utilized in the interactive system 10 of FIG. 1. Reference is now additionally made to FIG. 4. The fifth interactive application preferably includes a fifth game application, a simplified example of which is shown in FIG. 7. The fifth game application represents yet another type of interactive game applications that may be played in the interactive system 10.

The fifth game application is described below with reference to the preferred implementation of the interactive system 10 described above with reference to FIG. 4.

In the fifth game application, the IRD 550 of the display device 30 preferably receives background video for the fifth game application from broadcast transmissions transmitted by the headend 400 or from program material stored in the storage device 610 of the PVR 600. The background video for the fifth game application preferably includes a multiplicity of video frames, and at least one of the video frames preferably includes a plurality of sub-pictures, where each of the plurality of sub-pictures represents an alternative background. By way of example, in FIG. 7 only a single video frame 900 is depicted with three sub-pictures 910, 920 and 930, each of the three sub-pictures 910, 920 and 930 representing an alternative background. However, it is appreciated that additional video frames of the multiplicity of video frames may preferably include various numbers of sub-pictures that represent various and different alternative backgrounds. It is appreciated that at least one of the sub-pictures 910, 920 and 930 may include a 3D scene.

The IRD 550 also preferably receives object information for the fifth game application. The object information preferably includes information that determines an object 940. The object preferably includes a game object. By way of example, and without limiting the invention, the object 940 in FIG. 7 comprises a depiction of a spaceship.

It is appreciated that the IRD 550 may receive the object information for the fifth game application either from the broadcast transmissions transmitted by the headend 400 or from program material stored in the storage device 610 of the PVR 600. The IRD 550 may use a combination of background video from broadcast transmissions provided by the headend 400 and object information from program material stored in the storage device 610 of the PVR 600, or a combination of background video from program material stored in the storage device 610 of the PVR 600 and object information from broadcast transmissions provided by the headend 400 only if the display device 30 has capabilities for synchronization of the broadcast transmissions provided by the headend 400 and the program material stored in the storage device 610 of the PVR 600.

The alternative backgrounds represented by the three sub-pictures 910, 920 and 930 may, by way of example, refer to different paths of flight of the spaceship 940 flying through a canyon.

Preferably, the OSD unit 570 overlays the object 940 over the background video, and the processor 560 switches between a first sub-picture of the plurality of sub-pictures, for example the sub-picture 930, and a second sub-picture of the plurality of sub-pictures, for example the sub-picture 920, in response to the object 940 approaching or entering a border of the sub-picture 930. Preferably, after switching, the processor 560 upsamples the sub-picture 920, for example, to a full video frame which is preferably displayed on a display 950 as shown in FIG. 7.

It is appreciated that background audio may also be switched in a similar way, for example by simultaneously switching between different MPEG decoded audio outputs with a quick V-fade to avoid audio glitches. The term "V-fade" is used throughout the present specification and claims to refer to a ramp-down in volume of one audio source and a ramp up in volume of another audio source which graphically takes a V-shape form. The term "audio glitch" is used throughout the present specification and claims to refer to a crackle or popping noise which causes an audio signal to sound bad to a listener.

The fifth game application and the second game application may be played in a similar manner. The main differences between the fifth game application and the second game application result from the object 940 in the fifth game application being overlaid over the background video, whereas in the second game application the plane 240 (FIG. 2) is comprised in the background video, and from the switching between sub-pictures which, in the fifth game application, is typically performed in response to the object 940 approaching or entering a border of a sub-picture, whereas in the second game application the switching between sub-pictures is performed in response to user selection.

During playing of the fifth game application, a user preferably controls the spaceship 940 and selects paths along the canyon in an attempt to avoid a crash. Typically, each path may include different obstacles and may require various flying maneuvers. If the spaceship 940 collides with canyon walls or is hit by an enemy (not shown), the spaceship 940 sustains damage. If the damage is greater than a predefined game level, a game end is determined or a new round must be initiated.

In order to determine collisions between the spaceship 940 and canyon walls, distinguishing information related to the fifth game application may also preferably be provided to the IRD 550. The IRD 550 may preferably receive the distinguishing information either from the broadcast transmissions transmitted by the headend 400 or from the storage device 610 of the PVR 600. It is appreciated that the flu 550 may use a combination of hybrid reception of, for example, the distinguishing information from broadcast transmissions provided by the headend 400 and the background video and the object information from program material stored in the storage device 610 of the PVR 600, or any other appropriate combination of hybrid reception from both the headend 400 and the storage device 610 of the PVR 600 only if the display device 30 has capabilities for synchronization of the broadcast transmissions provided by the headend 400 and the program material stored in the storage device 610 of the PVR 600.

The distinguishing information preferably distinguishes portions of the background video by at least one characteristic. The at least one characteristic may, for example, include a characteristic as mentioned above with reference to FIG. 4, which characteristic preferably includes at least one of the following: a lighting characteristic; a physics characteristic; an alpha mask characteristic; a target characteristic; a dead zone characteristic; a characteristic of a game specific area; a preferred track characteristic; and a track-control characteristic.

Preferably, the IRD 550 provides the distinguishing information to the processor 560. The processor 560 preferably determines whether an action is to be performed on the object 940 based on the distinguishing information. Preferably, the processor 560 determines whether the action is to be performed on the object 940 by determining whether the action is to be performed on the object when the object moves from a first one of the portions of the background video towards a second one of the portions of the background video distinguished from the first one of the portions of the background video by the at least one characteristic. It is appreciated that the action typically includes an action in the fifth game application, such as a maneuver of the spaceship 940 to avoid collision.

The processor 560 may also preferably use the distinguishing information to trigger an audio signal when the object 940 moves from the first one of the portions of the background video towards the second one of the portions of the background video.

The distinguishing information preferably includes at least one of the following: at least one in-video mask; and interactive application data The at least one in-video mask preferably distinguishes between at least one of the following: boundary regions in the background video; and collision regions in the background video. The at least one in-video mask may preferably include an in-video mask as mentioned above with reference to FIG. 4, which in-video mask preferably includes at least one of the following: at least one alpha mask; at least one target; at least one dead zone; tracking information; and control information.

In FIG. 7, only some in-video masks 960 for one canyon wall are depicted for simplicity. However, it is appreciated that additional in-video masks may be applied for other appropriate background items in the background video. The in-video masks 960 may preferably be upsampled as necessary to provide a seamless game experience.

The in-video masks 960 in FIG. 7 represent a boundary of the canyon wall on the right as viewed from the spaceship 940 flying along the canyon. The in-video masks 960 may, for example, represent boundaries of the right canyon wall that will be viewed from the spaceship 940 if the spaceship 940 will take a turn to the right. In this respect, the in-video masks 960 represent a possible future scene. Such representation of a future scene is useful for enabling fast display of changing boundaries along a track for overcoming possible display latencies in the display device 30.

It is, however, appreciated that the in-video masks 960 may alternatively represent a current scene. It is further appreciated that processing complexity in the display device 30 may be reduced by processing only scene portions in which the spaceship 940 is about to move into.

It is appreciated that the present invention, in the embodiment of FIGS. 4 and 7 would, for example, enable a game such as "Rebel Assault", available from Lucas Arts™, to be played on the display device 30.

Figure 8:
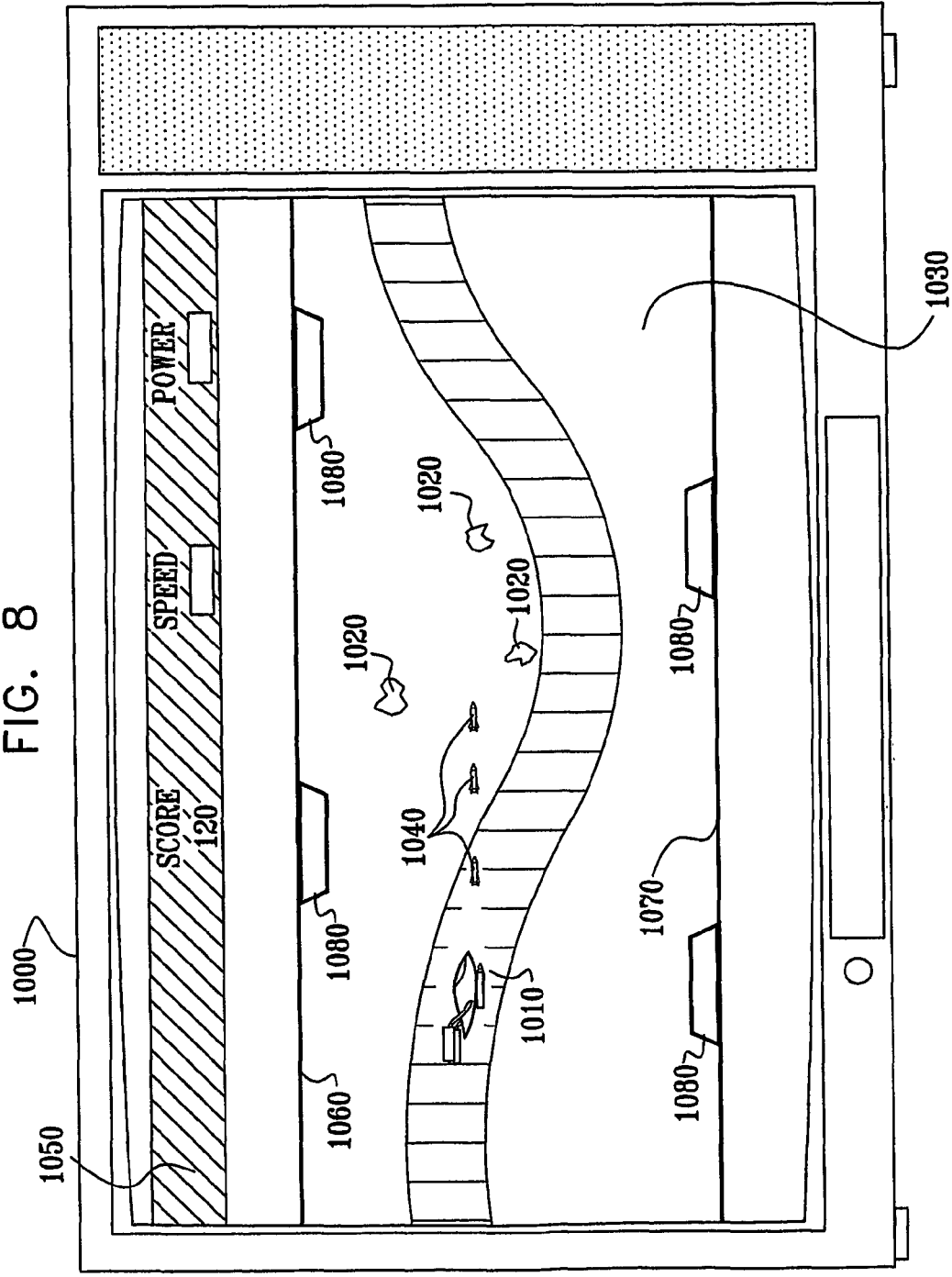
FIG. 8 is a simplified pictorial illustration of an example of a sixth interactive application utilized in the interactive system of FIG. 1.

Reference is now made to FIG. 8 which is a simplified pictorial illustration of an example of a sixth interactive application utilized in the interactive system 10 of FIG. 1. Reference is now additionally made to FIG. 4. The sixth interactive application preferably includes a sixth game application, a simplified example of which is shown in FIG. 8. The sixth game application represents still another type of interactive game applications that may be played in the interactive system 10.

The sixth game application is described below with reference to the preferred implementation of the interactive system 10 referred to in FIG. 4.

In the sixth game application, the IRD 550 of the display device 30 preferably receives background video and assistance information related to the sixth game application. The assistance information preferably includes area assistance information related to the background video and non-boundary assistance information.

The background video may be received from broadcast transmissions provided by the headend 400 or from the storage device 610 of the PVR 600. The assistance information may also be received from the broadcast transmissions or from the storage device 610 of the PVR 600. It is appreciated that the IRD 550 may use a combination of hybrid reception of the assistance information and the background information from both the headend 400 and the storage device 610 of the PVR 600 only if the display device 30 has capabilities for synchronization of the broadcast transmissions provided by the headend 400 and program material stored in the storage device 610 of the PVR 600.

Preferably, the processor 560 prepares graphics for the sixth game application for display at a display location based, at least in part, on at least a portion of the assistance information associated with the display location, and spatially synchronizes the prepared graphics with the background video. The at least a portion of the assistance information may preferably include non-boundary assistance information. The non-boundary assistance information may preferably include non-boundary assistance information as described above with reference to FIG. 4, which non-boundary assistance information preferably includes at least one of the following: physics information; lighting information; at least one alpha mask; information on at least one target zone; information on at least one dead zone; information regarding at least one game specific area; control information; and preferred track information.

It is appreciated that, upon preparing the graphics for display, the processor 560 may preferably temporally synchronize the prepared graphics with the background video. Synchronization is typically required because the background video typically runs at 24-30 frames/sec and objects created in the graphics must correctly interact with objects in the background video at appropriate times. It is appreciated that temporal synchronization may be frame accurate, as described, for example, in the above mentioned U.S. Provisional Patent Application Ser. No. 60/452,743 and UK Patent Application No. 0303093.9, the disclosures of which are hereby incorporated herein by reference. In a case where timing information received with the background video is in an encrypted form, the timing information is preferably decrypted by the IRD 550 to enable use of the timing information for the synchronization.

Preferably, the processor 560 renders the background video and the graphics for display, preferably in a synchronized form.

Upon preparing the graphics for display, the processor 560 may also preferably generate audio for rendering in association with the graphics. Generation of the audio may preferably include preparation of the audio for rendering in association with the graphics based, at least in part, on the at least a portion of the assistance information associated with the display location. The processor 560 may also preferably synchronize the prepared audio with the graphics and the background video.

The sixth game application is shown on a display 1000 in FIG. 8. Preferably, in the sixth game application a depiction of a spacecraft 1010 is controlled and guided by a player (not shown in FIG. 8) through obstacles and moving targets 1020 that are spread throughout a background video scene 1030. The background video scene 1030 preferably includes moving video images. The obstacles and moving targets 1020 and the background scene 1030 may be provided at various levels of difficulty of the game (game levels) that require increasing levels of playing skill of the player. The background scene 1030 preferably scrolls on through each game level. The player controls the spacecraft 1010 and attempts to avoid the obstacles and moving targets 1020, to shoot the obstacles and the moving targets 1020, and to avoid the spacecraft 1010 from being shot by the moving targets 1020.

The spacecraft 1010, a firing gun (not shown) of the spacecraft 1010, bullets 1040 fired by the gun, and the obstacles and moving targets 1020 may all be rendered as overlays that are overlaid over the background scene 1030, where the background scene 1030 is moving. A top bar 1050 may also be rendered as an overlay which includes elements, such as icons and display fields that provide power and speed to the spacecraft 1010 and display a score of the sixth game application as well as additional information if necessary.

Preferably, assistance information provided to the sixth game application includes information regarding boundaries in the sixth game application, such as information regarding a ceiling 1060, a floor 1070, and protrusions 1080 that protrude from the ceiling 1060 and/or the floor 1070. The information regarding boundaries may, for example, include spatial boundary information determining locations of the boundaries and/or temporal boundary information determining temporal boundaries, in a case where such temporal boundaries exist. The information regarding boundaries may alternatively or additionally include game logic specific attributes that can be defined at the boundaries.

Alternatively or additionally, the assistance information provided to the sixth game application may include information regarding at least one game specific area, where the at least one game specific area may, for example, include at least one of the following: a teleportation area in which the spacecraft 1010 may be maneuvered; an area in which the spacecraft 1010 may refuel; and an area in which the spacecraft 1010 may reload ammunition.

It is appreciated that the present invention, in the embodiment of FIGS. 4 and 8 would, for example, enable a shooting game such as "Defender", commercially available from Williams Entertainment, Inc., to be played on the display device 30.

Figure 9:
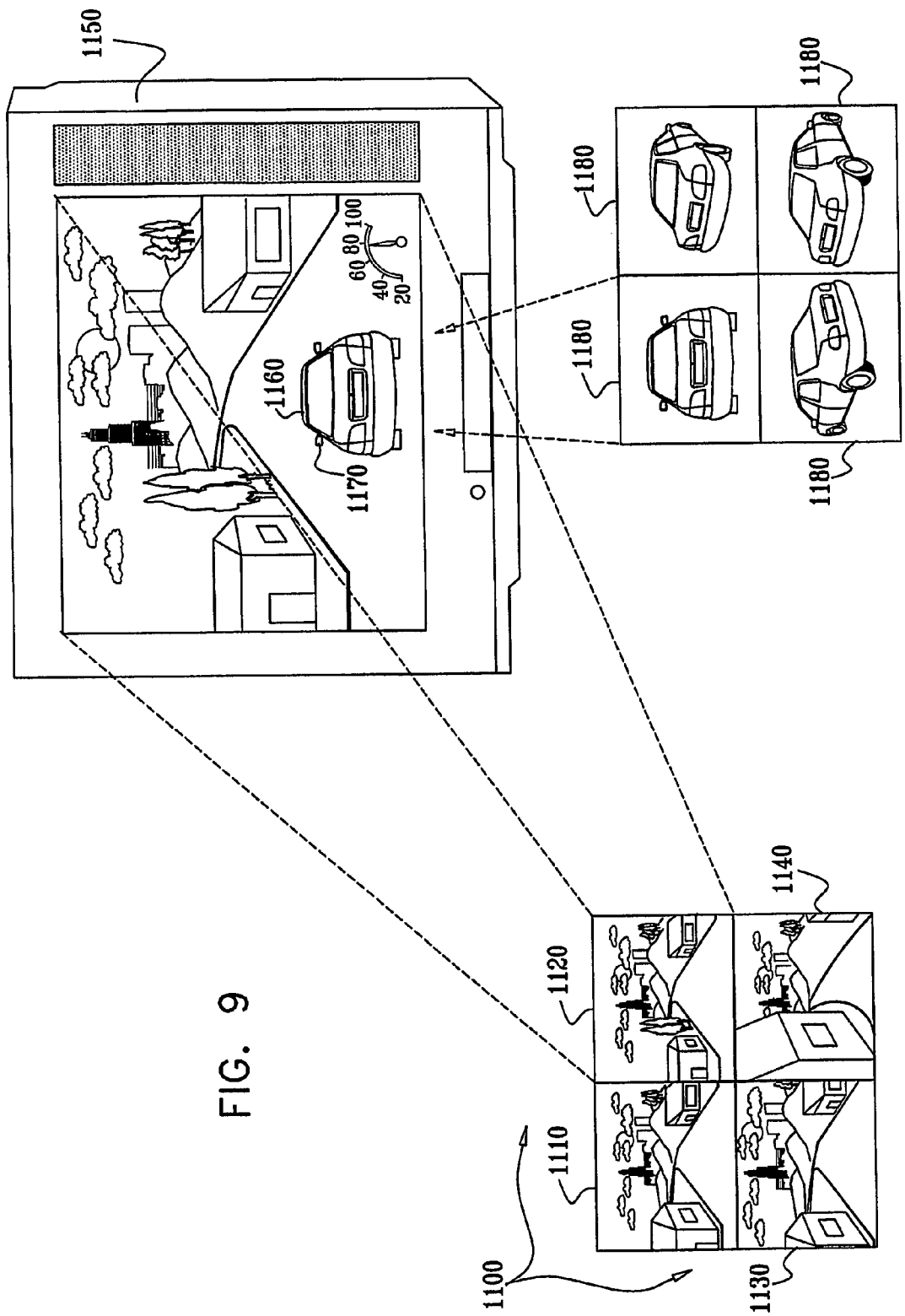
FIG. 9 is a simplified pictorial illustration of an example of a seventh interactive application utilized in the interactive system of FIG. 1.

Reference is now made to FIG. 9 which is a simplified pictorial illustration of an example of a seventh interactive application utilized in the interactive system 10 of FIG. 1. Reference is now additionally made to FIG. 4. The seventh interactive application preferably includes a seventh game application, a simplified example of which is shown in FIG. 9. The seventh game application represents yet another type of interactive game applications that may be played in the interactive system 10.

The seventh game application is described below with reference to the preferred implementation of the interactive system 10 described above with reference to FIG. 4.

In the seventh game application, the IRD 550 of the display device 30 preferably receives background video for the seventh game application from broadcast transmissions transmitted by the headend 400 or from program material stored in the storage device 610 of the PVR 600. The background video for the seventh game application preferably includes a multiplicity of video frames, and at least one of the video frames preferably includes a plurality of sub-pictures. It is appreciated that sub-pictures of a specific background video frame preferably represent different perspective views of at least part of a background scene in the specific background video frame.

By way of example only, in FIG. 9 a current background video frame 1100 is depicted with four sub-pictures 1110, 1120, 1130 and 1140 which respectively represent four different perspective views of at least part of the video frame 1100; it is appreciated, however, that additional video frames of the multiplicity of video frames may preferably include various numbers of sub-pictures that represent various and different perspective views of the background video.

Preferably, the processor 560 uses event information which is related to the current background video frame 1100 to switch from a first sub-picture of the four sub-pictures that provides a first perspective view of at least part of the background scene in the video frame 1100 to a second sub-picture of the four sub-pictures that provides a second perspective view of the at least part of the background scene in the video frame 1100.

After switching to the second sub-picture, the processor 560 preferably upsamples the second sub-picture, for example, to a full video frame. Upsampling of the second sub-picture is preferably performed for displaying on a display 1150. The processor 560 then preferably renders the upsampled second sub-picture for displaying on the display 1150.

The event information preferably includes at least one of the following: timing information; user input; an instruction from the headend 400; an instruction from a broadcast source; and an instruction embedded in the seventh game application.

It is appreciated that the first perspective view is preferably different from the second perspective view.

In the seventh game application, a player (not shown) plays a driver of a car 1160 in an automobile race. The car 1160 has a mirror 1170 that allows the driver to see things coming up from behind. The mirror 1170 may, for example, be comprised in background video provided from the headend 400 or from the PVR 600. If the driver collides with an object as he drives past the object to the point of blowing the object up, an explosion may be rendered in an overlay shown in the mirror 1170.

As the car 1160 is driven along a track, the car 1160 may, for example, move to the left side of the track or to the right side of the track. In such a case, the player's perspective view of background buildings and other landscape objects must change; that is, the player must see more or less of a building or a landscape object depending on whether the car 1160 is driven at the right side of the track or at the left side of the track and on how close the car 1160 approaches the building or the landscape object. Such a change in the player's perspective view may preferably be obtained by the processor 560 switching from a first sub-picture, for example the sub-picture 1120, to a second sub-picture, for example the sub-picture 1140. The processor 560 may then preferably upsample the sub-picture 1140 and render the sub-picture 1140 for displaying on the display 1150 in an upsampled form.

It is appreciated that sub-pictures 1180 may alternatively or additionally be provided with different angles of view of the car 1160. The different angles of view of the car 1160 may provide an illusion of a movement of the car 1160 to the left or to the right of the track. Switching between the sub-pictures 1180 may also be applied for background video having a fixed perspective view of background objects.

It is appreciated that the present invention, in the embodiment of FIGS. 4 and 9, would, for example, enable a game such as "The Need for Speed 2", commercially available from Electronic Arts™, to be played on the display device 30.

Figure 10:
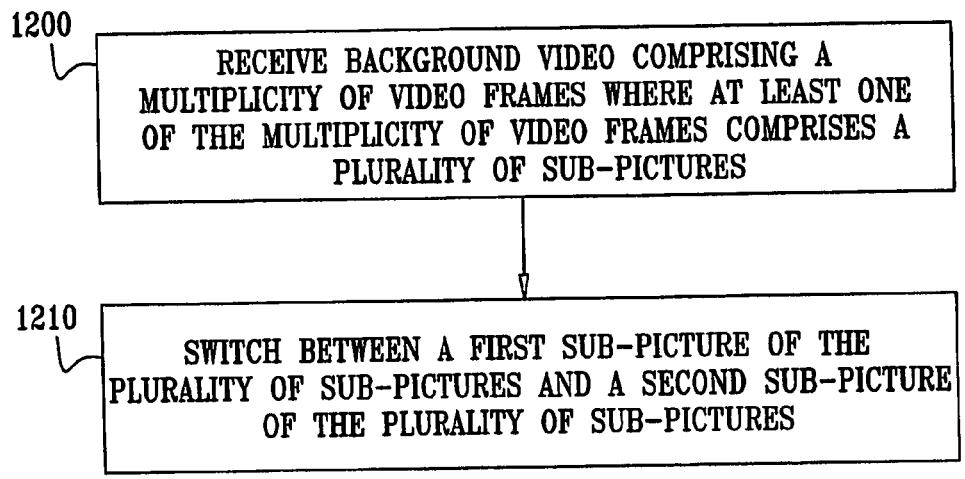
FIG. 10 is a simplified flowchart illustration of a preferred method of operation of a display device in the interactive system of FIG. 1.

Reference is now made to FIG. 10 which is a simplified flowchart illustration of a preferred method of operation of the display device 30 in the interactive system 10 of FIG. 1.

Preferably, background video comprising a multiplicity of video frames is received at a display device (step 1200), where at least one of the multiplicity of video frames comprises a plurality of sub-pictures, each of the plurality of sub-pictures representing an alternative background. Then at the display device, switching is performed (step 1210) between a first sub-picture of the plurality of sub-pictures and a second sub-picture of the plurality of sub-pictures.

Figure 11:
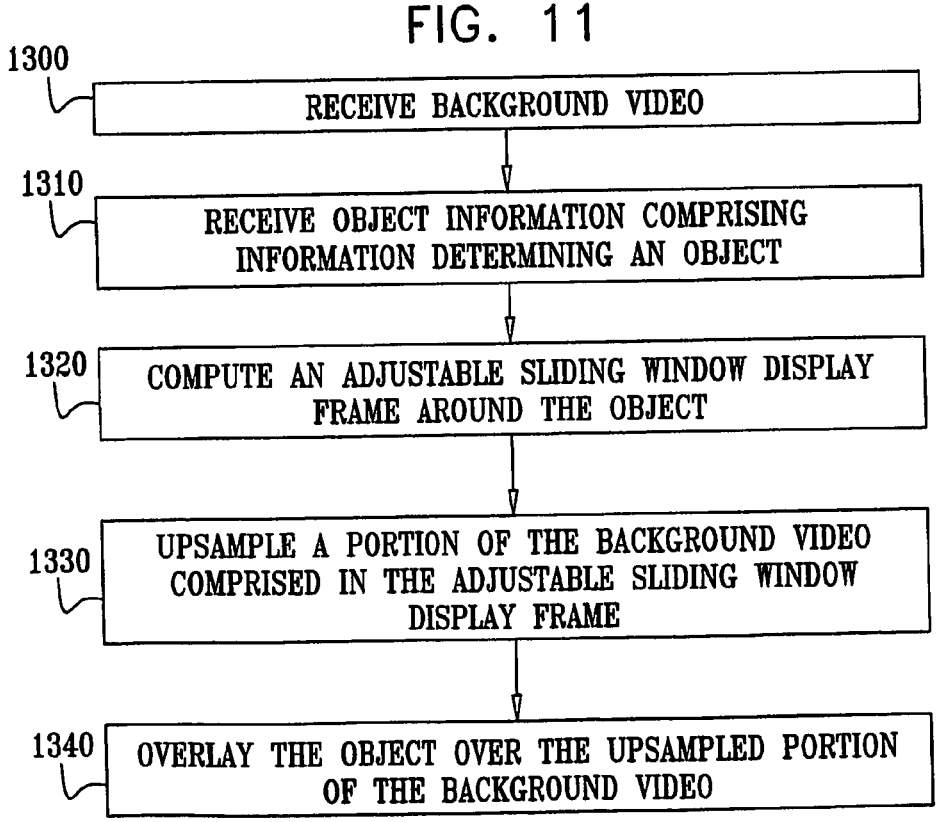
FIG. 11 is a simplified flowchart illustration of another preferred method of operation of a display device in the interactive system of FIG. 1.

Reference is now made to FIG. 11 which is a simplified flowchart illustration of another preferred method of operation of the display device 30 in the interactive system 10 of FIG. 1.

Preferably, background video is received at a display device (step 1300). Additionally, object information is also received at the display device (step 1310). The object information preferably includes information determining an object.

Further at the display device, an adjustable sliding window display frame is preferably computed (step 1320) around the object, and a portion of the background video comprised in the adjustable sliding window display frame is preferably upsampled (step 1330). The object is preferably overlaid (step 1340) over the upsampled portion of the background video.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. An interactive method comprising:
    receiving, at a display device, background video comprising encoded video frames, at least one encoded video frame comprising a plurality of sub-pictures, each of the plurality of sub-pictures comprising a different alternative background representing a possible outcome of an interactive video application;
    decoding said at least one encoded video frame to produce a decoded video frame;
    upsampling a first sub-picture of the plurality of sub-pictures of said decoded video frame to a first full upsampled video frame and displaying the first full upsampled video frame as a first alternative background;
    switching, at the display device, between the first sub-picture of the plurality of sub-pictures and a second sub-picture of the plurality of sub-pictures of said decoded video frame; and
    upsampling the second sub-picture to a second full upsampled video frame after the switching and displaying said second full upsampled video frame as a second alternative background instead of the first full upsampled video frame;
    displaying a display effect in response to the switching; and
    wherein the display effect comprises at least one of the following: an illusion of an image which is broader than an image displayed before the switching; an illusion of an image which is higher than the image displayed before the switching; an illusion of an image which is broader and higher than the image displayed before the switching; and an illusion of an image which is, with respect to the image displayed before the switching, at least one of the following: horizontally distorted; and vertically distorted.

2. The method according to claim 1 and wherein the upsampling comprises upsampling for displaying on a display.

3. The method according to claim 1 and wherein the switching comprises seamlessly switching between the first sub- picture and the second sub-picture.

4. The method according to claim 1 and wherein at least one of the first sub-picture and the second sub-picture comprises a 3-dimensional (3D) scene.

5. The method according to claim 1 and wherein the switching comprises switching between outputs of two audio decoders.

6. The method according to claim 1 and wherein the switching comprises switching between the first sub-picture and the second sub-picture in response to at least one of the following: timing information; user input; an instruction from a headend; an instruction from a broadcast source; and an instruction from an interactive application.

7. The method according to claim 1 and also comprising, prior to the switching:
    receiving object information at the display device, the object information comprising information determining an object; and
    overlaying, at the display device, the object over the background video.

8. The method according to claim 7 and wherein the switching comprises switching between the first sub-picture and the second sub-picture in response to the object approaching or entering a border of the first sub-picture.

9. The method according to claim 7 and wherein the object comprises a game object.

10. The method according to claim 7 and wherein the background video and the object information are related to an interactive game application.

11. The method according to claim 7 and also comprising:
    receiving, at the display device, distinguishing information distinguishing portions of the background video by at least one characteristic; and
    determining, at the display device, whether an action is to be performed on the object based on the distinguishing information.

12. The method according to claim 11 and wherein the determining comprises determining whether the action is to be performed on the object when the object moves from a first one of the portions of the background video towards a second one of the portions of the background video distinguished from the first one of the portions of the background video by the at least one characteristic.

13. The method according to claim 12 and also comprising using the distinguishing information to trigger an audio signal when the object moves from the first one of the portions of the background video towards the second one of the portions of the background video.

14. The method according to claim 11 and wherein the at least one characteristic comprises at least one of the following: a lighting characteristic; a physics characteristic; an alpha mask characteristic; a target characteristic; a dead zone characteristic; a characteristic of a game specific area; a preferred track characteristic; and a track-control characteristic.

15. The method according to claim 11 and wherein the distinguishing information comprises at least one of the following: at least one in-video mask; and interactive application data.

16. The method according to claim 15 and wherein the at least one in-video mask distinguishes between at least one of the following: boundary regions in the background video; and collision regions in the background video.

17. The method according to claim 15 and wherein the at least one in-video mask comprises at least one of the following: at least one alpha mask; at least one target; at least one dead zone; tracking information; and control information.

18. The method according to claim 11 and wherein the background video, the object information and the distinguishing information are related to an interactive game application, and the action comprises an action in the interactive game application.

19. The method according to claim 11 and wherein the step of receiving background video comprises receiving the background video from a broadcast transmission, the step of receiving object information comprises receiving the object information from a broadcast transmission, and the step of receiving distinguishing information comprises receiving the distinguishing information from one of the following: a broadcast transmission; and a storage device of a PVR.

20. The method according to claim 1 and also comprising:
    receiving assistance information at the display device, the assistance information comprising area assistance information related to the background video;
    preparing, at the display device, graphics for display at a display location, the preparing being based, at least in part, on at least a portion of the assistance information associated with the display location; and
    spatially synchronizing the prepared graphics with the background video.

21. The method according to claim 20 and wherein the at least a portion of the assistance information comprises non-boundary assistance information.

22. The method according to claim 21 and wherein the non-boundary assistance information comprises at least one of the following: physics information; lighting information; at least one alpha mask; information on at least one target zone; information on at least one dead zone; information regarding at least one game specific area; control information; and preferred track information.

23. The method according to claim 20 and wherein the preparing also comprises:
temporally synchronizing the prepared graphics with the background video.

24. The method according to claim 20 and also comprising:
displaying the prepared graphics and the background video in a synchronized form.

25. The method according to claim 20 and wherein said preparing also comprises the step of generating, at the display device, audio for rendering in association with the graphics.

26. The method according to claim 25 and wherein said generating comprises preparing the audio for rendering in association with the graphics based, at least in part, on the at least a portion of the assistance information associated with the display location.

27. The method according to claim 26 and wherein the generating also comprises synchronizing the prepared audio with the graphics and the background video.

28. The method according to claim 20 and wherein the background video, the assistance information, and the graphics are related to an interactive game application.

29. The method according to claim 1 and wherein the first sub-picture corresponds to a first perspective view of a scene and the second sub-picture corresponds to a second perspective view of the scene.

30. The method according to claim 29 and wherein the first perspective view is different from the second perspective view.

31. The method according to claim 1 and also comprising:
receiving object information at the display device, the object information comprising information determining an object;
computing, at the display device, an adjustable sliding window display frame around the object;
upsampling a portion of the background video comprised in the adjustable sliding window display frame; and
overlaying, at the display device, the object over the upsampled portion of the background video.

32. The method according to claim 1, wherein the background video is received from one or more of the following:
a broadcast;
a video-on-demand (VOD) transmission; and
a near video-on-demand (NVOD) transmission, and
the background video is used directly, and not from storage local to the display device.

33. The method according to claim 1, wherein the receiving at the display device consists of receiving a single stream of background video.

34. A display device comprising:
a receiver receiving background video comprising encoded video frames, at lease one encoded video frame comprising a plurality of sub-pictures, each of the plurality of sub-picture comprising a different alternative background representing a possible outcome of an interactive video application;
a decoder decoding said at least one encoded video frame to produce a decoded video frame;
an upsampler which upsamples a first sub-picture of the plurality of sub-pictures of said decoded video frame to a first full upsampled video frame;
a renderer rendering the first full upsampled video frame for display as an first alternative background; and
a processor switching between the first sub-picture of the plurality of sub-pictures and a second sub-picture of the plurality of sub-pictures of said decoded video frame;
the upsampler upsampling the second sub-picture to a second full upsampled video frame after the switching, and the renderer rendering the second full upsampled video frame for display as a second alternative background instead of the first full upsampled video frame;
wherein the processor displays a display effect in response to the switching and
wherein the display effect comprises at least one of the following: an illusion of an image which is broader than an image displayed before the switching; an illusion of an image which is higher than the image displayed before the switching; an illusion of an image which is broader and higher than the image displayed before the switching; and an illusion of an image which is, with respect to the image displayed before the switching, at least one of the following: horizontally distorted; and vertically distorted.

35. A display device comprising:
means for receiving background video comprising encoded video frames, at least one encoded video frame comprising a plurality of sub-pictures, each of the plurality of sub-pictures comprising a different alternative background representing a possible outcome of an interactive video application;
means for decoding said at least one encoded video frame to produce a decoded video frame;
means for upsampling a first sub-picture of the plurality of sub-pictures of said decoded video frame to a first full upsampled video frame;
means for rendering the first full upsampled video frame for display as a first alternative background; and
means for switching between the first sub-picture and the plurality of sub-pictures and a second sub-picture of the plurality of sub-pictures of said decoded video frame, and rendering the second sub-picture for display; and
the means for upsampling upsampling the second sub-picture to a second full upsampled video frame after the switching, and the means for rendering rendering the second full upsampled video frame for display as a second alternative background instead of the first full upsampled video frame; and
means for displaying a display effect in response to the switching,
wherein the display effect comprises at least one of the following: an illusion of an image which is broader than an image displayed before the switching; an illusion of an image which is higher than the image displayed before the switching; an illusion of an image which is broader and higher than the image displayed before the switching; and an illusion of an image which is, with respect to the image displayed before the switching, at least one of the following: horizontally distorted; and vertically distorted.

* * * * *